US012626220B2

(12) United States Patent
MacLaughlin et al.

(10) Patent No.: US 12,626,220 B2
(45) Date of Patent: May 12, 2026

(54) PRODUCT DISTRIBUTION SYSTEM AND METHOD

(71) Applicant: DeLorean Artificial Intelligence, Inc., Palm Beach, FL (US)

(72) Inventors: Severence M. MacLaughlin, Palm Beach, FL (US); Ram Prasad Bora, Palm Beach, FL (US); Dhiraj Sharma, Palm Beach, FL (US)

(73) Assignee: DeLorean Artificial Intelligence, Inc., Palm Beach, FL (US)

( * ) Notice: Subject to any disclaimer, the term of this patent is extended or adjusted under 35 U.S.C. 154(b) by 0 days.

(21) Appl. No.: 18/516,354

(22) Filed: Nov. 21, 2023

(65) Prior Publication Data

US 2025/0165918 A1     May 22, 2025

(51) Int. Cl.
G06Q 10/087          (2023.01)
G06Q 30/0202        (2023.01)
(52) U.S. Cl.
CPC ....... G06Q 10/087 (2013.01); G06Q 30/0202 (2013.01)
(58) Field of Classification Search
CPC ...... G06Q 10/04; G06Q 10/087; G06Q 30/02; G06Q 10/08; G06Q 10/06; G06Q 30/0206;

(Continued)

(56) References Cited

U.S. PATENT DOCUMENTS

| 5,966,126 A | 10/1999 | Szabo |
| 8,548,937 B2 | 10/2013 | Saigal |

(Continued)

FOREIGN PATENT DOCUMENTS

| CN | 106096657 A | 11/2016 |
| CN | 107515898 A | 12/2017 |

(Continued)

OTHER PUBLICATIONS

International Search Report and Written Opinion for International application No. PCT/US2023/080751 dated Aug. 20, 2024, pp. 1-11.

(Continued)

*Primary Examiner* — Florian M Zeender
*Assistant Examiner* — Vanessa Deligi
(74) *Attorney, Agent, or Firm* — Pillsbury Winthrop Shaw Pittman LLP

(57)          ABSTRACT

Product distribution including receiving external conditions data indicative of environmental conditions concerning distribution of products from a point of sale (POS), determining a POS product distribution model for the POS, including first and second product distribution models operable to determine distribution of the first and second products to the POS based on external conditions data, determining, based on application of the external conditions data to the POS product distribution model, a product distribution to the POS, including application of the external conditions data to the first and second product distribution model to determine distributions of the first and second products to the POS, and providing supply instructions for the POS, including first and second product supply instructions to cause the product supply network to provide the distribution of the first and second product to the POS.

14 Claims, 9 Drawing Sheets

(58) Field of Classification Search

CPC .......... G06Q 10/0631; G06Q 10/0637; G06Q 30/06; G06Q 10/06375; G06Q 10/0833; G06Q 30/0201; G06Q 30/08; G06Q 30/0202; G06Q 2220/00; G06Q 10/06315

See application file for complete search history.

(56) References Cited

U.S. PATENT DOCUMENTS

| | | | |
|---|---|---|---|
| 10,483,003 B1 | 11/2019 | Mcnair | |
| 11,093,880 B2 | 8/2021 | Anderson | |
| 11,093,884 B2 | 8/2021 | Devarakonda et al. | |
| 11,210,300 B2 | 12/2021 | Ignatyev | |
| 11,282,022 B2 | 3/2022 | Devarakonda et al. | |
| 11,514,379 B2 | 11/2022 | Adrian | |
| 11,581,092 B1 | 2/2023 | Mcnair | |
| 11,723,560 B2 | 8/2023 | Constantin | |
| 11,790,412 B2 | 10/2023 | Pachauri et al. | |
| 2002/0143635 A1 | 10/2002 | Goodwin, III | |
| 2005/0234761 A1 | 10/2005 | Pinto | |
| 2006/0085408 A1 | 4/2006 | Morsa | |
| 2006/0190310 A1 | 8/2006 | Gudla | |
| 2007/0043609 A1 | 2/2007 | Imam et al. | |
| 2007/0043611 A1 | 2/2007 | Newman | |
| 2007/0112704 A1 | 5/2007 | Tomkins | |
| 2007/0288297 A1 | 12/2007 | Karras | |
| 2010/0010878 A1 | 1/2010 | Pinto | |
| 2010/0287059 A1 | 11/2010 | Mccoy et al. | |
| 2011/0270646 A1 | 11/2011 | Prasanna | |
| 2011/0295783 A1 | 12/2011 | Zhao | |
| 2012/0059779 A1 | 3/2012 | Syed | |
| 2012/0284213 A1 | 11/2012 | Lin | |
| 2012/0303412 A1 | 11/2012 | Etzioni et al. | |
| 2013/0151311 A1 | 6/2013 | Smallwood | |
| 2014/0081738 A1 | 3/2014 | Abraham | |
| 2014/0101143 A1 | 4/2014 | Zhang | |
| 2014/0372351 A1 | 12/2014 | Sun | |
| 2015/0032526 A1 | 1/2015 | Calman et al. | |
| 2015/0100356 A1 | 4/2015 | Bessler | |
| 2015/0149237 A1 | 5/2015 | Brock | |
| 2016/0063506 A1 | 3/2016 | Hicks | |
| 2016/0239808 A1 | 8/2016 | Ryu | |
| 2018/0060744 A1 | 3/2018 | Achin | |
| 2018/0218247 A1 | 8/2018 | Lee et al. | |
| 2018/0315141 A1 | 11/2018 | Hunn | |
| 2019/0116265 A1 | 4/2019 | Avila et al. | |
| 2019/0130425 A1* | 5/2019 | Lei ..................... G06Q 30/0201 |
| 2019/0139054 A1 | 5/2019 | Mathrubootham et al. | |
| 2019/0259043 A1* | 8/2019 | Koneri ................. G06Q 10/087 |
| 2019/0378074 A1 | 12/2019 | Mcphatter | |
| 2020/0184417 A1 | 6/2020 | Rosenfeld et al. | |
| 2020/0210922 A1* | 7/2020 | Devarakonda ......... G06Q 10/08 |
| 2020/0293946 A1 | 9/2020 | Sachan | |
| 2021/0014136 A1 | 1/2021 | Rath | |
| 2021/0049700 A1 | 2/2021 | Nguyen | |
| 2021/0202103 A1 | 7/2021 | Bostic | |
| 2021/0310075 A1 | 10/2021 | Grail | |
| 2021/0343411 A1 | 11/2021 | Zhang et al. | |
| 2021/0390498 A1 | 12/2021 | Ohlsson et al. | |
| 2022/0138785 A1 | 5/2022 | Zarakas et al. | |
| 2022/0172257 A1 | 6/2022 | Mustafi | |
| 2022/0263731 A1 | 8/2022 | Gupta et al. | |
| 2022/0358514 A1 | 11/2022 | Duff | |
| 2023/0119881 A1 | 4/2023 | Makhija | |
| 2023/0177516 A1 | 6/2023 | He | |
| 2023/0177537 A1 | 6/2023 | Maclaughlin | |
| 2023/0267370 A1 | 8/2023 | Copeland | |
| 2023/0307115 A1 | 9/2023 | Kumar | |
| 2024/0054447 A1 | 2/2024 | Kwon | |
| 2024/0119346 A1 | 4/2024 | Chang et al. | |
| 2024/0177841 A1 | 5/2024 | Mamaghani | |
| 2024/0378494 A1 | 11/2024 | Biswas | |
| 2024/0386372 A1 | 11/2024 | Vanbrocklin | |
| 2025/0181592 A1 | 6/2025 | Khan | |
| 2025/0181602 A1 | 6/2025 | Khan | |

FOREIGN PATENT DOCUMENTS

| | | |
|---|---|---|
| CN | 108520045 A | 9/2018 |
| CN | 105022740 A | 11/2025 |
| JP | 2007-141036 A | 6/2007 |
| KR | 10-2018-0029593 A | 3/2018 |
| KR | 20200099284 A | 8/2020 |
| KR | 1020210042709 A | 4/2021 |
| WO | 2020-163381 A1 | 8/2020 |
| WO | 2020245727 A1 | 12/2020 |

OTHER PUBLICATIONS

"LightGBM", Wikipedia.org, retrieved Nov. 16, 2023, pp. 1-3.

"Logistic regression", Wikipedia.org, retrieved Nov. 16, 2023, pp. 1-30.

"Long short-term memory", Wikipedia.org, retrieved Nov. 16, 2023, pp. 1-14.

"Machine learning", Wikipedia.org, retrieved Nov. 16, 2023, pp. 1-34.

"Naive Bayes classifier", Wikipedia.org, retrieved Nov. 16, 2023, pp. 1-12.

"Random forest", Wikipedia.org, retrieved Nov. 16, 2023, pp. 1-13.

"Support vector machine", Wikipedia.org, retrieved Nov. 16, 2023, pp. 1-13.

"Training, validation, and test data sets", retrieved Nov. 16, 2023, pp. 1-6.

"XGBoost", Wikipedia.org, retrieved Nov. 16, 2023, pp. 1-4.

"Artifical neural network", Wikipedia.org, retrieved Nov. 16, 2023, pp. 1-38.

"Autoregressive model", Wikipedia.org, retrieved Nov. 16, 2023, pp. 1-12.

"BERT (language model)", Wikipedia.org, retrieved Nov. 16, 2023, pp. 1-6.

"CatBoost", Wikipedia.org, retrieved Nov. 16, 2023, pp. 1-3.

"Decision tree learning", Wikipedia.org, retrieved Nov. 16, 2023, pp. 1-12.

"Decomposition of time series", Wikipedia.org, retrieved Nov. 16, 2023, pp. 1-3.

"Deep learning", Wikipedia.org, retrieved Nov. 16, 2023, pp. 1-45.

"Ensemble learning", Wikipedia.org, retrieved Nov. 16, 2023, pp. 1-15.

"Feedforward neural network", Wikipedia.org, retrieved Nov. 16, 2023, pp. 1-7.

"Gated recurrent unit", Wikipedia.org, retrieved Nov. 16, 2023, pp. 1-4.

"Gradient boosting", Wikipedia.org, retrieved Nov. 16, 2023, pp. 1-10.

"K-nearest neighbors algorithm", Wikipedia.org, retrieved Nov. 16, 2023, pp. 1-11.

"Cluster analysis", Wikipedia.org, retrieved Nov. 20, 2023, pp. 1-22.

International Search Report and Written Opinion for International Application No. PCT/US2023/080231 dated Aug. 12, 2024, pp. 1-13.

International Search Report and Written Opinion for International application No. PCT/US2024/039962 dated Apr. 14, 2025, pp. 1-14.

Non-Final Office Action for U.S. Appl. No. 18/482,741 dated May 19, 2025, pp. 1.

Office Action for China Application No. 202080101992.0 dated Mar. 27, 2025, pp. 1-4.

Li, Dan, et al. "Machine learning-aided risk stratification system for the prediction of coronary artery disease." International Journal of Cardiology 326 (2021): 30-34. (Year: 2021).

Non-Final Office Action for U.S. Appl. No. 17/999,045 dated Jun. 30, 2025, pp. 1-26.

Office Action for Chinese Application No. 202080101992.0 dated Jul. 30, 2025, pp. 1-9.

Non-Final Office Action for U.S. Appl. No. 18/786,540 dated Sep. 11, 2025, pp. 1-48.

International Search Report and Written Opinion received for PCT Patent Application No. PCT/US2023/076284, mailed on Jul. 2, 2024, pp. 1-13.

(56)           References Cited

OTHER PUBLICATIONS

Extended European Search Report received for European Application No. 20938380.1, mailed on Nov. 30, 2023, pp. 1-5.
Non-Final Office Action for related U.S. Appl. No. 17/999,045 dated Jul. 2, 2024, pp. 1-44.
Artificial Intelligence-Enhanced Predictive Insights for Advancing Financial Inclusion: A Human-Centric AI-Thinking Approach Meng-Leong How; Sin-Mei Cheah; Khor, Aik Cheow; Chan, Yong Jiet. Big Data and Cognitive Computing 4.2: 8. MDPI AG (2020), 13 pages.
P. Ongsulee, V. Chotchaung, E. Bamrungsi and T. Rodcheewit, "Big Data, Predictive Analytics and Machine Learning," 2018 16th International Conference on ICT and Knowledge Engineering (ICT &KE), Bangkok, Thailand, 2018, pp. 1-6.

* cited by examiner

Product Data

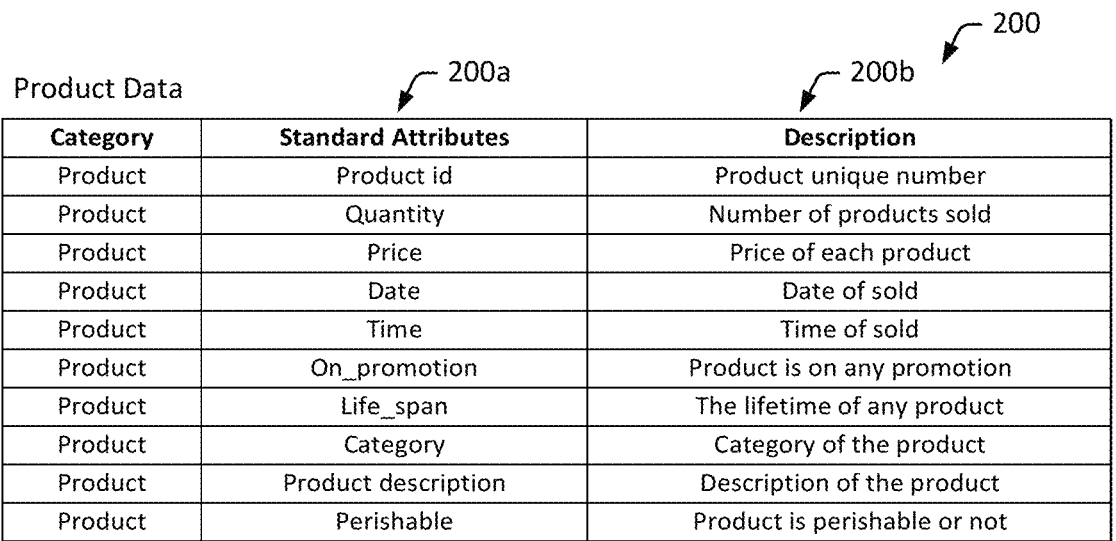

| Category | Standard Attributes | Description |
|----------|---------------------|-------------|
| Product | Product id | Product unique number |
| Product | Quantity | Number of products sold |
| Product | Price | Price of each product |
| Product | Date | Date of sold |
| Product | Time | Time of sold |
| Product | On_promotion | Product is on any promotion |
| Product | Life_span | The lifetime of any product |
| Product | Category | Category of the product |
| Product | Product description | Description of the product |
| Product | Perishable | Product is perishable or not |

. . .

Store Data

| Category | Standard Attributes | Description |
|----------|---------------------|-------------|
| Store | Store_id | Unique number of each store |
| Store | Store_name | Store_name |
| Store | Store_banner | Brand banner of store |
| Store | Address | Address of store |
| Store | Country | County in which store is located |
| Store | Location | Zip code/state |
| Store | Fuel | Store sell fuel or not |
| Store | Store Type | Supermarket or commercial |
| Store | Type of ownership | Franchise, independent, etc. |
| Store | Store_storage | Storage space for each product in each store |

. . .

Shipment and Returns Data

| Category | Standard Attributes | Description |
|----------|---------------------|-------------|
| Store | Store_id | Unique number of each store |
| Store | Store_name | Store_name |
| Store | Store_banner | Brand banner of store |
| Store | Address | Address of store |
| Store | Country | County in which store is located |
| Store | Location | Zip code/state |
| Store | Fuel | Store sell fuel or not |
| Store | Store Type | Supermarket or commercial |
| Store | Type of ownership | Franchise, independent, etc. |
| Store | Store_storage | Storage space for each product in each store |

| External Data Log 132 | | | | |
|---|---|---|---|---|
| Category | External Event Location | Date | Time | Description |
| Weather | Marfa, Texas | 7/8/2024 | 8:00pm CST | Severe thunderstorms within the area |
| Weather | Eureka Springs, Arkansas | 12/6/2023 | 2:00am CST | Torrential flooding within the area |
| Traffic | Brattleboro, Vermont | 10/18/2023 | 6:00pm EST | Light traffic flow despite rush hour |
| Traffic | Secaucus, New Jersey | 11/2/2023 | 5:00pm EST | Heavy traffic congestion |
| Local Event | Washington, D.C. | 4/2/2023 | 7:00pm EST | Bad Bunny concert |
| Local Event | Ojai, California | 3/2/2023 | 8:00am PST | Local town fair |
| Supply Chain Disruption | Blackfoot, Idaho | 7/1/2024 | 9:00am MST | Shortage of potato crop due to saturated soil |

Distribution Performance Log 142

| Product SKU | Point of Sale | Units | Transaction Type | Date & Time of External Event |
|---|---|---|---|---|
| XYZ5678-BLK-32 | Store A | 30 | Product Supplied | 12/20/2023 3:00pm EST |
| XYZ5678-BLK-32 | Store A | 12 | Product Sale | 12/22/2023 3:00pm EST |
| PQR9876-BLU-8.5 | Store B | 32 | Product Supplied | 12/23/2023 5:00pm EST |
| XYZ5678-BLK-32 | Store A | 18 | Disposal (to Trash) | 12/23/2023 6:00pm EST |
| PQR9876-BLU-8.5 | Store B | 4 | Product Sale | 12/24/2023 3:00pm EST |

PRODUCT DISTRIBUTION SYSTEM AND METHOD

FIELD

Embodiments relate generally to distributing products and more particularly to systems and methods for assessing and implementing product distribution to points of sale or other outlets.

BACKGROUND

Retail stores typically manage a diverse inventory of items, with each set of unique items identified by a corresponding Stock Keeping Unit ("SKU"). SKUs can represent a broad range of products, from electronics to groceries, that are regularly replenished by suppliers to maintain a product availability and appealing display. However, inventory management is complex and fraught with challenges. Consumer demand for items can fluctuate dramatically. Moreover, a significant portion of products maintained by retail stores, such as grocery stores, include perishable items, like bread and flowers, which have a limited shelf life. These types of products pose a unique challenge, because if they are not sold within a specific timeframe, often just a few days, they must be discarded, which leads to lost revenue.

SUMMARY

Product demand variability is often influenced by factors such as seasonal changes, social trends, local events, such as cultural festivals, or the like. For example, demand for certain foods or decorations may spike during holiday seasons, while sporting events might increase sales of sports memorabilia. As a result, product inventory and sales can be difficult to predict and manage. Inventory and sales fluctuations can lead to at least two problematic scenarios: a surplus of unsold products or, conversely, a shortage of items leading to empty shelves. Both situations can be detrimental to a store's profitability—the former results in increased waste and the latter in missed sales opportunities. To navigate these challenges and maximize profits, retail stores often focus on certain goals: (1) reducing wastage, particularly of perishable goods, which involves strategic buying and inventory rotation; (2) avoiding empty shelves, which requires careful demand forecasting and inventory management to ensure a consistent and adequate supply of products; and (3) adapting their supply chain and inventory levels to align with the varying demand of different items.

Distribution managers are typically responsible for determining how products are to be distributed among product outlets, often with the above or other goals in mind. For example, a product distribution manager may determine what quantities of goods should be provided to retail stores, and when, to ensure that low demand products are not overstocked and that high demand products are available at stores with willing buyers. However, their methods often hinge on intuition. For example, a distribution manager might predict the sale of a particular product at a specific retail location based on their perception of consumer demand. However, this approach often overlooks external factors that can significantly impact shopping behavior. For example, it might not correctly recognize that an impending storm in the area could deter customers from visiting the store, leading to overstocking of perishable items in parallel with an unexpected drop in sales. Or, it may fail to correctly recognize demand for a product during the storm, leading to a shortage of the product for willing buyers. Accordingly, it may be desirable to provide sophisticated systems that can effectively assess and manage product distribution processes. Continuing with the above example, it may be desirable for a distribution manager to have access to a distribution system that effectively integrates internal and external factors, to provide a comprehensive and robust analytical product distribution assessment and solution.

Although certain systems may be proficient at calculating optimal stock levels for individual stores based on limited data, such as that stores historical sales data, they typically do not appropriately consider and account for external factors and experience across multiple store locations. For example, traditional systems might suggest an ideal quantity of winter clothing based on previous winters' sales. However, they might not account for a forecasted milder winter, or other circumstances, that could reduce consumer demand. Similarly, these systems often operate in isolation, determining stock levels for each store without considering the broader network. This approach misses opportunities for efficiency gains through store aggregation. For example, if one store has a surplus of a product while another nearby store experiences a shortage, an aggregated system could identify and rectify this imbalance, optimizing inventory and sales across the product distribution network. Furthermore, a notable limitation of existing systems is their inability to effectively integrate and respond to the introduction of new stores within the network. These systems, often operating in isolation, lacking capability to compare the characteristics of a new store with existing ones in the network, or to take advantage of trends for established stores that are similarly situated. As a result, they struggle to provide accurate stocking recommendations for new stores from the outset, missing the opportunity for optimized inventory management and sales from the beginning.

Provided are embodiments for accurately assessing and implementing product distribution. For example, certain embodiments provide for forecasting sales for products (or "SKUs") at store locations within a retail network and generating precise supply instructions (e.g., product instructions) to ensure that the stores are appropriately stocked. In some embodiments, a distribution engine is operable to assess, monitor, and route an optimal amount of product to one or more points of sale ("POSs"). For example, a distribution engine may receive external conditions data indicative of one or more environmental conditions concerning distribution of products from a point of sale, determine an optimal product distribution for the point of sale, effectuate routing of the optimal product distribution to the point of sale, and monitor the point of sale (and other points of sale among the retail network) for point of sale data, which can in turn be used to assess and update product distributions. Such a cycle may continue for stores across the network, resulting in optimization of product distributions to points of sale of the network. This may, in effect, provide for product demand matching distribution to stores across the network, reducing waste associated with perishable goods, waste of fuel and transportation resources associated with delivery of unneeded product, and waste of store footprint and stocking resources associated with overstocking of unneeded products.

In some embodiments, a distribution engine employs a distribution module that is operable to provide supply instructions (e.g., product instructions) to distribution managers. For example, a distribution engine may employ a distribution module that is operable to receive external conditions data indicative of one or more environmental conditions concerning distribution of products from a point of sale (e.g., local weather conditions), determine an optimal distribution of a product for the point of sale (e.g., based on predicted consumer demand for the product at the point of sale), and communicate specific supply instructions to distribution managers. In some embodiments, a similar process may be implemented for some or all of the other products at the point of sale, as well as for other stores and their respective products. The respective supply instructions may, in turn, be employed to execute an efficient and effective distribution of products to points of sale.

In some embodiments, a distribution module employs artificial intelligence ("AI") based modeling for determining an optimal distribution of a product for a point of sale. For example, a product distribution model may employ one or more machine learning models trained using an external conditions dataset, such as external data logs (e.g., logs of past historical external data, supply chains events, and external factors effecting consumer demand for a product). Continuing with the above example, the product distribution model may include a point of sale (POS) model associated with a retail store, with the POS model including a plurality of individual product distribution models that are each associated with a particular product sold by the store and that are trained to determine a recommended distribution of the product to the point of sale based on external events by way of machine learning on external data (e.g., based on a log of past historical external data, supply chains events, and external factors effecting consumer demand for the associated product) or internal data (e.g., distribution performance dataset indicative of historical distributions to points of sale and product disposition products at points of sale).

BRIEF DESCRIPTION OF THE DRAWINGS

FIG. 2 is a diagram that illustrates example internal data attributes in accordance with one or more embodiments.

FIG. 3 is a diagram that illustrates example external data in accordance with one or more embodiments.

FIG. 4 is a diagram that illustrates an example distribution performance log in accordance with one or more embodiments.

FIGS. 8A and 8B are diagrams that illustrate example interfaces and reportings in accordance with one or more embodiments.

Figure 1A:
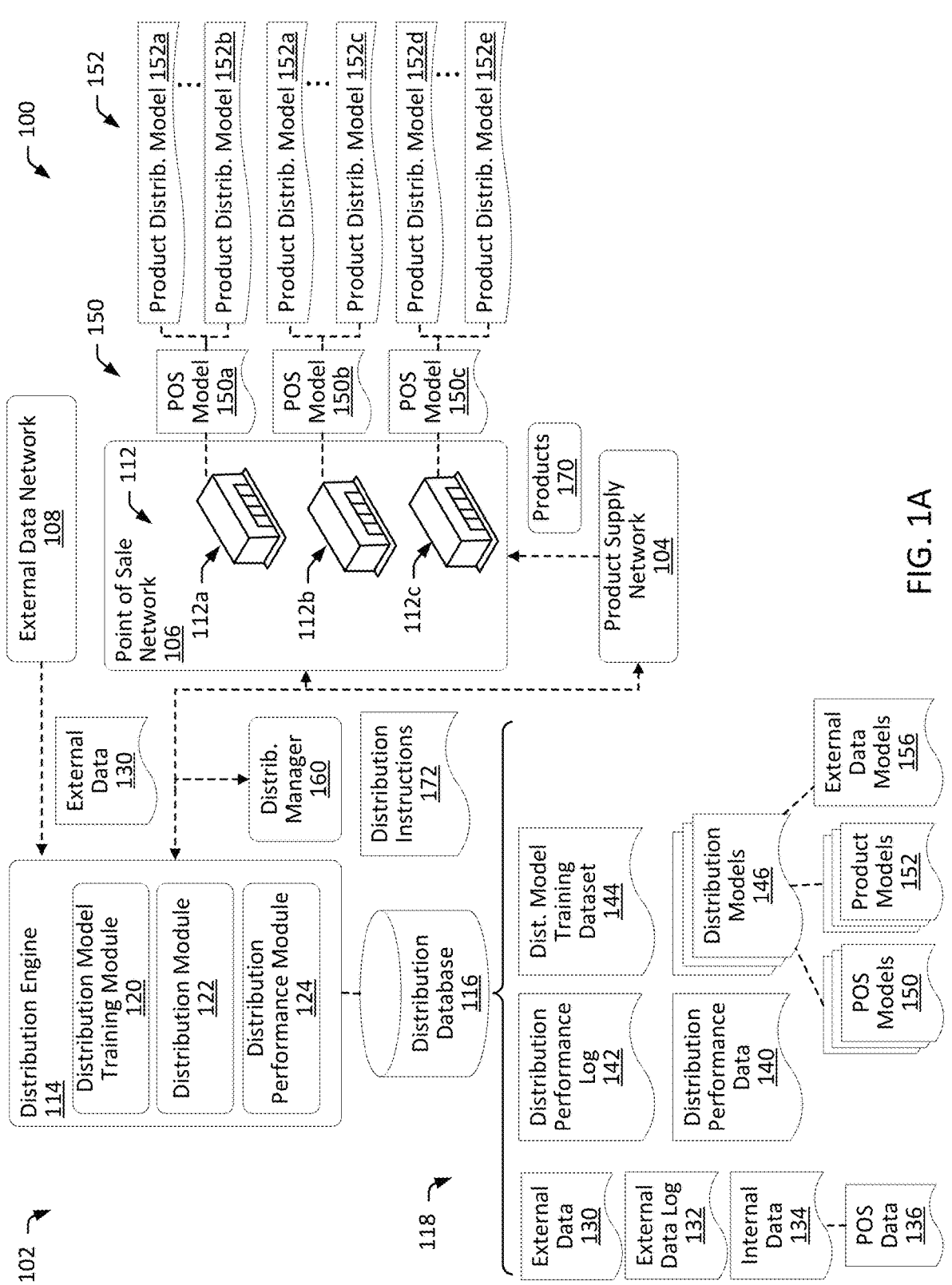
FIG. 1A is diagram that illustrates a distribution network environment in accordance with one or more embodiments.

While this disclosure is susceptible to various modifications and alternative forms, specific example embodiments are shown and described. The drawings may not be to scale. It should be understood that the drawings and the detailed description are not intended to limit the disclosure to the particular form disclosed, but are intended to disclose modifications, equivalents, and alternatives falling within the spirit and scope of the present disclosure as defined by the claims.

DETAILED DESCRIPTION

Provided are embodiments for accurately assessing and implementing product distribution. For example, certain embodiments provide for forecasting sales for products (or "SKUs") at store locations within a retail network and generating precise supply instructions (e.g., product instructions) to ensure that the stores are appropriately stocked. In some embodiments, a distribution engine is operable to assess, monitor, and route an optimal amount of product to one or more points of sale ("POSs"). For example, a distribution engine may receive external conditions data indicative of one or more environmental conditions concerning distribution of products from a point of sale, determine an optimal product distribution for the point of sale, effectuate routing of the optimal product distribution to the point of sale, and monitor the point of sale (and other points of sale among the retail network) for point of sale data, which can in turn be used to assess and update product distributions. Such a cycle may continue for stores across the network, resulting in optimization of product distributions to points of sale of the network. This may, in effect, provide for product demand matching distribution to stores across the network, reducing waste associated with perishable goods, waste of fuel and transportation resources associated with delivery of unneeded product, and waste of store footprint and stocking resources associated with overstocking of unneeded products.

In some embodiments, a distribution engine employs a distribution module that is operable to provide supply instructions (e.g., product instructions) to distribution managers. For example, a distribution engine may employ a distribution module that is operable to receive external conditions data indicative of one or more environmental conditions concerning distribution of products from a point of sale (e.g., local weather conditions), determine an optimal distribution of a product for the point of sale (e.g., based on predicted consumer demand for the product at the point of sale), and communicate specific supply instructions to distribution managers. In some embodiments, a similar process may be implemented for some or all of the other products at the point of sale, as well as for other stores and their respective products. The respective supply instructions may, in turn, be employed to execute an efficient and effective distribution of products to points of sale.

In some embodiments, a distribution module employs artificial intelligence ("AI") based modeling for determining an optimal distribution of a product for a point of sale. For example, a product distribution model may employ one or more machine learning models trained using an external conditions dataset, such as external data logs (e.g., logs of past historical external data, supply chains events, and external factors effecting consumer demand for a product). Continuing with the above example, the product distribution model may include a point of sale (POS) model associated with a retail store, with the POS model including a plurality of individual product distribution models that are each associated with a particular product sold by the store and that are trained to determine a recommended distribution of the product to the point of sale based on external events by way of machine learning on external data (e.g., based on a log of past historical external data, supply chains events, and external factors effecting consumer demand for the associated product) or internal data (e.g., distribution performance dataset indicative of historical distributions to points of sale and product disposition products at points of sale).

Although certain example embodiments are described in the context of product distribution to points of sale, such as retail stores, embodiments may be employed in any suitable context, such as supply chain management across different industries and outlets, such as inventory control in healthcare facilities, resource allocation in manufacturing processes, distribution of digital content across online platforms, delivery of services, or the like.

FIG. 1A is a diagram that illustrates a product distribution environment ("environment") 100 in accordance with one or more embodiments. In the illustrated embodiment, the environment 100 includes a distribution network management system ("management system") 102, a product supply network ("supply network") 104, a point of sale network ("POS network") 106, and an external data network 108. The POS network 106 includes points of sale ("POSs") 112 (e.g., including points of sale 112a, 112b and 112c). The management system 102 includes a distribution engine 114 and a distribution database 116 storing distribution data 118. The distribution engine 114 includes a distribution model training module ("training module") 120, a distribution module 122, and a distribution performance module ("performance module") 124. The distribution data 118 may include, for example, external conditions data (or "external data") 130, an external data log 132 (e.g., including structured log of external data 130), internal data 134 (e.g., including point of sale data ("POS data") 136), distribution performance data 140, a distribution performance log 142 (e.g., including a structured log of distribution performance data 140), a distribution model training dataset 144, distribution models 146 (e.g., including point of sale (POS) models ("POS models") 150, product models 152, and external data models 156). As described, in some embodiments, a distribution manager 160 may be employed to coordinate interactions between the management system 102, the product supply network 104, or the point of sale network 106.

In some embodiments, the distribution management system 102 is employed to determine types and quantities of products 170 to be distributed to particular points of sale 112 (e.g., to points of sale 112a, 112b and 112c) and to generate corresponding distribution instructions (or "supply instructions") 172. The product supply network 104 may be employed to execute distribution of associated products 170 to the points of sale 112 in accordance with the distribution instructions 172. For example, the training module 120 may be employed to generate (or "train") distribution models 146 (e.g., including POS models 150 and product models 152) based on a distribution model training dataset 144 (e.g., including a distribution performance log 142 and an external data log 132). The distribution module 122 may, for example, be employed to determine distribution next best actions ("NBAs"), (e.g., expressed as distribution instructions 172 that specify quantities of specific products 170 to be distributed to specific points of sale 112), based on application of external data 130 to the distribution models 146, and to cause execution of those next best actions (e.g., to communicate, to the product supply network 104, corresponding distribution instructions 172 commanding distribution of corresponding quantities of products 170 to the points of sale 112). The distribution performance module 124 may, for example, be employed to monitor distribution and sales of products 170 across the various points of sale 112, and to generate corresponding data (e.g., distribution performance data 140) that can be used as a basis to assess product distribution or used for updating (or "re-training") of the distribution models 146 (e.g., for updating of the distribution models 146 by the training module 120). As described, the cycle of processes may be repeated on a regular basis to continually fine-tune product demand predictions, and associated product distributions, across the point of sale network 106.

Figure 9:
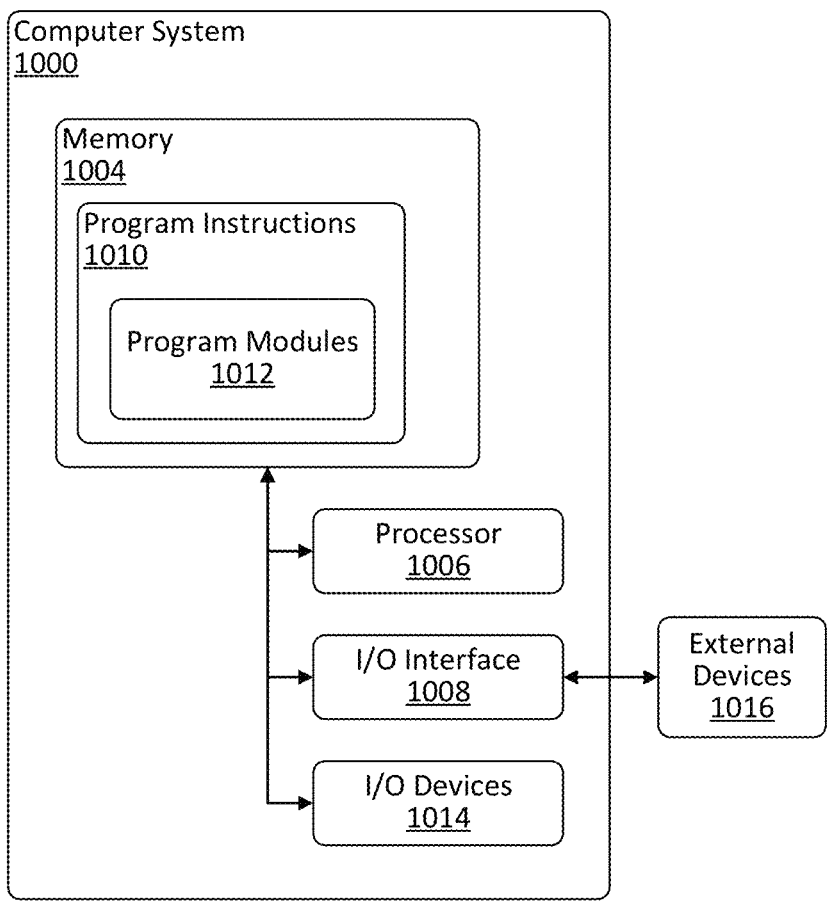
FIG. 9 is a diagram that illustrates an example computer system in accordance with one or more embodiments.

In some embodiments, the management system 102 includes a computer system that is the same or similar to that of computer system 1000 described with regard to at least FIG. 9. In some embodiments, the distribution engine 114 is executed by the management system 102 to perform operations described here, such as assessing, executing, and monitoring distribution of products 170 to points of sale 112. For example, the distribution engine 114 may include one or more software applications that are executed on the management system 102 to generate distribution models 146, apply distribution data 118 (e.g., including external data 130) to the distribution models 146 to determine a quantity of a given product 170 to distribute to a given point of sale 112, to provide distribution instructions 172 to cause the distribution of the quantity of the given product 170 to the given point of sale 112, to monitor the distribution performance of the routing of products 170 among the point of sale network 106, and to update associated distribution models 146 based on the distribution performance.

A point of sale 112 (e.g., point of sale 112a, 112b or 112c) may be a location where a customer completes a transaction for a goods or services. In some embodiments, a point of sale 112 is retail store that stocks products for purchase by a customer. For example, in the context of grocery type products, a point of sale 112 may be a grocery store that stocks and sells grocery type products, such as bread, milk, cereal, or the like. In the context of clothing type products, a point of sale 112 may be a clothing store that stocks and sells clothing type products, such as pants, shirts, socks, or the like. It will be appreciated that a point of sale 112 may stock and sell any variety of products. For example, a supermarket type point of sale 112 may stock and sell groceries, clothing, sporting goods, home goods, car care products, or the like. A point of sale 112 may be, for example, a brick-and-mortar store that physically stocks products in inventory at the store, where a customer can physically visit the store to view and purchase the products in inventory. In some embodiments, a point of sale 112 includes or employs a computer system that is the same or similar to that of computer system 1000 described with regard to at least FIG. 9.

The point of sale network 106 may include one or more points of sale 112. For example, in the illustrated embodiment, the point of sale network 106 includes three different points of sale 112a, 112b and 112c. These may include, for example, three different supermarket stores at respective, first, second and third geographic locations. Different points of sale 112 within a point of sale network 106 may share certain characteristics, while differing in other characteristics. For example, two supermarkets within a point of sale network 106 may have similar product offerings (e.g., having the same or similar product selection) and physical geographic characteristics (e.g., being located in similar weather climate), while having different customer demographics (e.g., being surrounded or frequented by lower or higher income populations). As described, distribution determinations may be employed that recognize similarities and differences between different points of sale 112, which can in turn facilitate accurate predictions of product demand for particular stores and products, and associated product distribution. In some embodiments, a point of sale network 106 includes or employs a computer system that is the same or similar to that of computer system 1000 described with regard to at least FIG. 9.

The product supply network 104 may include one or more suppliers of products 170. For example, where the points of 112 include a supermarkets that stock and sell groceries, clothing, sporting goods, home goods, and car care products, the product supply network 104 may include manufacturers, vendors, or the like, of groceries, clothing, sporting goods, home goods, and car care products. In some embodiments, the product supply network 104 is operable to receive instructions regarding distribution of a given product 170 to a point of sale 112, and effectuate supplying that given product 170 to a point of sale 112. For example, in response to a vendor of groceries in the product supply network 104 receiving a distribution (or "supply") instruction 172 specifying distribution of a food product 170 to point of sale 112*a*, the vendor of groceries may in turn effectuate supplying the food product 170 to point of sale 112*a*. In some embodiments, preparation of a product 170 for distribution (e.g., baking, manufacturing, assembly, or the like of a product 170) is structured around the receipt of corresponding supply instructions 172. For example, in response to a provider of a product 170 in the product supply network 104 receiving distribution (or "supply") instructions 172 specifying distribution of the product 170 to point of sale 112*a*, the provider may in turn effectuate the making of the product 170 and supplying the product 170 to point of sale 112*a*. For example, in response to a provider of bread in the product supply network 104 receiving distribution (or "supply") instructions 172 specifying distribution of 100 loaves of bread product 170 to point of sale 112*a* on Thursday, the provider may in turn effectuate the baking of 100 loaves of bread product 170 on Wednesday (e.g., including having supplies delivered on Wednesday, scheduling employee shifts, initiating baking Wednesday evening, or the like) to provide for supplying the 100 loaves of bread product 170 to point of sale 112*a* on Thursday. In some embodiments, production of a product is based on the distribution determinations and instructions. For example, in response to determining a quantity of product (e.g., 100 loaves of bread) to be distributed to point of sale 112*a*, the management system 102 may provide distribution instructions 172 to a supplier (e.g., a bakery) specifying production of quantity of product (e.g., bake 100 loaves of bread for Grocery Store A), and, in turn, the supplier (e.g., the bakery) may produce and deliver the quantity of product based on the instructions (e.g., the bakery may bake 100 loaves of bread and deliver them to Grocery Store A). In some embodiments, supply instructions are distributed to multiple suppliers to provide needed quantities of products. For example, in response to determining a quantity of product (e.g., 100 loaves of bread) to be distributed to point of sale 112*a*, the management system 102 may provide distribution (or "supply") instructions 172 across multiple suppliers (e.g., first and second bakeries) based on capabilities of the suppliers. This may include determining that a first supplier (e.g., a first bakery) is capable of supplying a given amount of product (e.g., 70 loaves of bread) and determining that a second supplier (e.g., a second bakery) is capable of supplying a given amount of product (e.g., 50 loaves of bread), determining (based on capabilities) the quantity of products to be supplied by the respective suppliers (e.g., 60 loaves to be supplied by the first bakery and 40 loaves to be supplied by the second bakery), and providing corresponding instructions to the suppliers (e.g., send instructions to the first bakery to supply the first point of sale with 60 loaves of bread, and send instructions to the second bakery to supply the first point of sale with 40 loaves of bread). Such determinations of supplier use and distributing of supply tasks may be based on a variety of factors, such as listed or forecast supplier capacity, availability of raw materials, proximity, transportation availability, maximizing profit (e.g., minimizing costs), or the like. If for example, a determination is made that the desired quantities cannot be provided (e.g., if there is a shortage of materials), the management system 102 may determine an optimal distribution (e.g., that maximizes sales or revenue, or reduces waste), and provide corresponding distribution instructions 172. For example, where it is determined that 8,000 of a needed 10,000 loaves of bread can be supplied, the management system 102 may determine a full distribution of loaves to stores that are more likely to sell their inventory, and a partial distribution of loaves to stores that are less likely to sell their inventory, in a manner that maximizes expected sales or revenue or minimizes waste. In some embodiments, the distribution determinations can be used as a basis to inform and instruct various aspects of the supply chain, including sourcing and distribution of materials for production. For example, where it is determined that a given quantity of product is to be distributed on a given day (e.g., 10,000 loaves of bread to various points of sale 112 on Thursday), the management system 102 may provide distribution instructions 172 to material providers that instruct providing of necessary materials to produce the given quantity of product (e.g., instructions provided to suppliers of flour, yeast or other bread making products to provide needed amounts of materials to one or more associated bakeries on Tuesday so the bakeries have the necessary ingredients to bake the bread for delivery on Thursday). In some embodiments, the distribution determination are made to maximize revenue by, for example, causing purchases of supplies at times of low expected costs. The product supply network 104 may include logistics providers, such as shipping services, that can provide for transportation of product 170 to associated points of sale 112. In some embodiments, the management system 102 may provide instructions or information to logistics providers to coordinate efforts in providing needed logistics to route products, such as materials, end products, or the like. Thus, the distribution predictions described here can inform, and serve as a basis of, any variety of supply related decisions and actions, for example, enabling on-demand product production and delivery. In some embodiments, a product supply network 104 includes or employs a computer system that is the same or similar to that of computer system 1000 described with regard to at least FIG. 9.

Internal data 134 may include data sourced from within (or "internal" to) a product distribution chain that has the potential to influence the distribution of products supplied by way of the product distribution chain. For example, in the context of products 170 sold by way points of sale 112*a*, 112*b*, or 112*c*, internal data 134 may include data sourced from within distribution chain (e.g., from one or more of the points of sale 112*a*, 112*b* or 112*c* (or another entity of the point of sale network 106), the product supply network 104, or the distribution manager 160, that has the potential to influence the distribution of the products 170 supplied by way of the product distribution chain. In some embodiments, internal data 134 includes data that is indicative of product demand for products 170 at one or more points of sale 112, or the ability to supply of products 170 by way of one or more points of sale 112. For example, in the context of products 170 sold by way points of sale 112*a*, 112*b*, or 112*c*, internal data 134 may include route data, salesperson data, supply chain data, demand production per point of sale data, marketing data, route to market ("RTM") data, sales data, product data, point of sale data, shipment and returns data, or the like concerning products sold by way points of sale 112a, 112b, or 112c. In some embodiments, the internal data 134 may be associated with a particular point of sale 112 or a specific product 170. For example, internal data 134 may include sales and disposition data for a specific product 170 at a given point of sale 112, details about the available shelf space allocated for a specific product 170 at a given point of sale 112, or the like. In some embodiments, internal data 134 is provided by a point of sale 112. For example, point of sale 112a may communicate sales and disposition data for a specific product 170 at a given point of sale 112, a number of nearby sales representatives that are available to locally market a product 170 to potential consumers within a region surrounding the point of sale 112a. In some embodiments, internal data 134 includes populated attribute values for corresponding attributes, such as store identification, store type, quantity/date of products sold, product price, product life span, product damage, or the like. FIG. 2 is a diagram that illustrates example internal data attributes 200 in accordance with one or more embodiments. In the illustrated embodiment, the example standard attributes 200a include attributes of "Product id", "Quantity" and so forth, accompanied by an associated description of what the attribute concerns. For example, the "Product id" attribute may be a unique SKU for an associated product 170. The "Description" attribute 200b may be a "complete distribution description" associated with the product 170, point of sale 112, or the like. The "Description" attribute 200b provides additional context for determining the weight of a specific attribute when the distribution engine 114 formulates supply instructions to optimize product distribution. Internal data 134 for a given point of sale 112 may include a set of populated attribute values for some or all of the attribute fields, for some or all of the products 170 sold at the point of sale 112. Internal data 134 for the point of sale network 106 may include a set of populated attribute values for some or all of the attribute fields, for some or all of the products 170 sold at the points of sale 112 of the point of sale network 106. In some embodiments, the internal data 134 includes unstructured, structured, or semi-structured data. For example, internal data 134 for products 170 sold at a given point of sale 112 may include, for each of the products 170, structured data including a populated attribute value for each of some or all of the standard attributes 200a listed.

External data 130 may include data sourced from outside of (or "external" to) a product distribution chain that has the potential to influence the distribution of products supplied by way of the product distribution chain. For example, in the context of products 170 sold by way points of sale 112a, 112b, or 112c, external data 130 may include data sourced from outside the distribution chain (e.g., from an external data network 108) that has the potential to influence the distribution of the products 170 supplied by way of the product distribution chain. As described, an external data network 108 may not include the points of sale 112a, 112b or 112c (or another entity of the point of sale network 106), the product supply network 104, or the distribution manager 160. In some embodiments, external data 130 includes data that is indicative of product demand for products 170 at one or more points of sale 112 or the ability to supply of products 170 by way of one or more points of sale 112. This may include data that is indicative of a variety of external conditions, such as weather, local events, or the like, that may have an impact upon the demand or distribution of a particular product 170 to a point of sale 112. For example, external data 130 may include weather data, local event data, time of year data, demographic data, promotional (e.g., local or national) data, geolocation data, traffic data, social media data, news data, or the like. In some embodiments, external data 130 is associated with a particular point of sale 112 or a specific product 170 or supply chain thereof. For example, external data 130 may include details of an upcoming local event, which could boost foot traffic from certain consumer demographics at a nearby point of sale 112, potentially enhancing sales for specific products 170. External data 130 may come from a variety of sources among the external data network 108. For example, external data 130 may include weather information sourced from a weather provider, social media posts sourced from a social media platform, event information sourced from a news outlet or a local chamber of commerce, or the like. In some embodiments, external data 130 includes unstructured, structured, or semi-structured data. For example, external data 130 may include unstructured text of social media posts, a semi-structured description of weather forecasts for days of the next week, a structured calendar of events, or the like.

In some embodiments, an external data log 132 includes a log of historical external data 130. FIG. 3 is a diagram that illustrates example external data log 132 in accordance with one or more embodiments. As described, the external data log 132 may be generated from external data 130 that is transformed into structured data by way of an external data model 156. In the illustrated embodiment, the external data log 132 includes rows of structured external data 130 (e.g., rows 300) that each include data corresponding to an external event that is categorized. As illustrated, the categories may include weather, traffic, local events, supply chain disruptions, or the like. For example, a first external data event is assigned a specific "Category," in this case, being "Weather." Additional attribute values may also be listed and detailed to provide a comprehensive overview of a particular external data event 300a. For example, this may include specifying the "External Event Location," which pinpoints the geographical site of the event. The "Date" and "Time" attributes may mark the exact occurrence of the event, giving a temporal context. Furthermore, a "Description" attribute may be included to offer a narrative or detailed explanation about the nature and significance of the event. As described, such external data may be employed to make informed and comprehensive product distribution decisions. In some embodiments, the external data is scraped from a variety of sources among the external data network 108 and pre-processed via the external data model 156 to be structurally formatted data (e.g., like structured external data 130 depicted int FIG. 3) to generate an external data log 132 including a structured representation of the external data 130, which may be more easily digestible by the distribution engine 114.

The external data network 108 may include one or more sources of external data 130. For example, the external data network 108 may be weather stations, social media platforms, research institutions, news organizations, government agencies, the internet, or the like. In the context of social media, external data 130 may include social media posts and the external data network 130 may include the social media platform that provides the social media post. In the context of weather data, external data 130 may include weather forecasts and the external data network 130 may include a weather provider, such as a weather website, that provides the weather forecasts.

The distribution manager 160 may include an entity (e.g., a person or a computer system) that coordinates interactions between the management system 102, the product supply network 104, or the point of sale network 106. For example, the distribution manager 160 may receive distribution instructions 172 from the distribution module 122 that specify distribution of given products 170 to point of sale 112a, and provide the distribution instructions 172 to the product supply network 104 and the point of sale 112a to coordinate and effectuate distribution of distribution of the given products 170 to point of sale 112a. As another example, the distribution manager 160 may receive internal or external data from an associated source, and route corresponding information to the distribution performance module 124, which may in turn be used as a basis for distribution performance data 140 or the external data log 132. In some embodiments, the distribution manager 160 is an element of the management system 102. In some embodiments, the distribution manager 160 includes or employs a computer system that is the same or similar to that of computer system 1000 described with regard to at least FIG. 9.

In some embodiments, distribution performance data 140 includes data that indicates characteristics of distributions of products 170 to points of sale 112. Distribution performance data 140 for sales of a given product 170 by a given point of sale 112 may include data indicative of supply of the products 170 to the point of sale 112 and disposition of the products 170 at point of sale 112, such as by sale, theft, trash, or the like. For example, distribution performance data 140 for sales of a given product 170 by a given point of sale 112 may include, for the product 170 and points of sale 112 pair, an indication of the time/date when quantities of the product 170 were provided to the point of sale 112, and an indication of how and when of deposition of the products 170 occurred (e.g., by way of a sale at a given time/date, being discarded a given time/date, or the like). Such data may enable a determination of how products have been distributed and their disposition (e.g., sale or trash type disposal). Distribution performance data 140 may include any other data that could be relevant to assessing distribution of a product 170 to points of sale 112, such as delivery timeliness data (e.g., measuring the punctuality of product 170 deliveries to each point of sale 112, which may be crucial for maintaining inventory levels and customer satisfaction), inventory turnover rates (e.g., indicating how quickly products 170 are sold and restocked at each point of sale 112, which can help in assessing the demand and supply balance), wastage levels (e.g., highlighting the amount of products 170 that expired or became unsellable, especially important for perishable goods), distribution efficiency (e.g., indicating the cost-effectiveness of the distribution routes and methods used, including transportation costs and time taken), customer demand fulfillment (e.g., tracking how well the product distribution aligns with customer demand at each point of sale 112, which may be critical for minimizing overstocking or stockouts), return and exchange rates (e.g., documenting the frequency of product 170 returns or exchanges at a particular point of sale 112, which may indicate issues with product 170 quality or point of sale 112 customer satisfaction), or the like. In some embodiments, the distribution performance data 140 is recorded, or otherwise incorporated, in the distribution performance log 142, serving as a training dataset for the training and refinement of the distribution models 146.

In some embodiments, a distribution performance log 142 includes a log of historical distribution performance data

140. The distribution performance log 142 may, for example, include data that indicates characteristics of historical distributions of products 170 to points of sale 112. A distribution performance log 142 may include data indicative of sales of products 170 at various points of sale 112. For example, a distribution performance log 142 may provide, for each of different products 170 and points of sale 112 pairs, an indication of the time/date when quantities of the products 170 were provided to the point of sale 112, and an indication of how and when of deposition of the products 170 occurred (e.g., by way of a sale at a given time/date, being discarded a given time/date, or the like). Such data may enable a determination of how products have been distributed and their disposition (e.g., sale or trash type disposal). FIG. 4 is a diagram that illustrates an example distribution performance log 142 in accordance with one or more embodiments. In some embodiments, the distribution performance log 142 is generated using distribution performance data 140, such as sales information included in internal data 134 collected from points of sale 112, the product supply network 104, the distribution manager 160, or the like. For example, the distribution performance log 142 includes an aggregation of distribution performance data 140, including individual rows 402 generated from respective subsets of distribution performance data 140.

As described here in some embodiments, point of sale models 150 are generated for respective points of sale 112 of the point of sale network 106, and the point of sale models 150 are employed to determine when and how to distribute products to the respective points of sale 112. In some embodiments, a point of sale model 150 is associated with a given point of sale 112, and includes one or more individual product distribution models 152 that are associated with products 170 sold by the point of sale 112. For example, where point of sale 112a is a grocery store ("Grocery Store A") that sells bread, milk, and cereal, a point of sale model 150a for the point of sale 112a may include a "bread" product distribution model 152a that models distribution of bread for Grocery Store A, a "milk" product distribution model 152b that models distribution of milk for Grocery Store A, and so forth, for some or all of the products sold for Grocery Store A. Similarly, where point of sale 112b is a grocery store ("Grocery Store B") that sells bread, milk, and cereal, a point of sale model 150b for the point of sale 112b may include a "bread" product distribution model 152a that models distribution of bread for Grocery Store B, a "milk" product distribution models 152c that models distribution of milk for Grocery Store B, and so forth for some or all of the products sold by Grocery Store B. Similarly, where point of sale 112c is a sporting goods store ("Sports Store A") that sells shoes, shirts, and balls, a point of sale model 150c for the point of sale 112c may include a "shoes" product distribution model 152d that models distribution of shoes for Sports Store A, a "shirts" product distribution model 152c that models distribution of shirts for Sports Store A, and so forth for some or all of the products sold by Sports Store A.

In some embodiments, a product distribution model 152 of a given POS model 150 for a given point of sale 112 is determined or selected based on characteristics of the given point of sale 112. For example, the "bread" product distribution model 152a may be determined based on internal data 134 for point of sale 112a ("Grocery Store A"), such as supply and disposition information for bread for point of sale 112a. A product distribution model 152 of a point of sale model 150 associated with a point of sale 112 may be included in the point of sale model 150 based on it having characteristics that align with characteristics of the point of sale 112. In some embodiments, product distribution models 152 are associated with a set of model characteristics (e.g., product type, location, store type, or the like), points of sale 112 are associated with a set of POS characteristics (e.g., product types, location, store type, or the like), and one or more product distribution models 152 are selected for inclusion in the point of sale model 150 for a point of sale 112 based on the respective product distribution model 152 sharing characteristics with the points of sale 112 (e.g., the respective product distribution model 152 having one or more model characteristics that match POS characteristics of the point of sale 112). For example, the "bread" product distribution model 152a may be determined based on internal data 134 for point of sale 112a ("Grocery Store A") or similar points of sale 112, such as supply and disposition information for bread for point of sale 112a and points of sale 112 having similar characteristics, such as similar locations, product selections, customer demographics, or the like. As another example, the "bread" product distribution model 152a may be selected for use in POS model 150a for point of sale 112a ("Grocery Store A") based on "bread" product distribution model 152a having associated characteristics that match with characteristics of point of sale 112a, such as location, product selection, customer demographic, or the like. As another example, where the point of sale 112a (Grocery Store A) is an established grocery store in New York City that sells a given set of products (e.g., bread, milk, cereal, etc.) and having a POS model 150a that includes a respective product distribution model 152 for the given set of products (e.g., product distribution model 152a for bread, product distribution model 152b for milk and so forth), and a "new" location of the grocery store (Grocery Store B) has just opened in New York City and has the same or similar characteristics as Grocery Store A (including the same product selection as Grocery Store A), a POS model 150 for the new Grocery Store B may include product distribution models 152 that are the same or similar to those of POS model 150a (e.g., including the product distribution model 152a for bread, the product distribution model 152b for milk, and so forth). Accordingly, a customized POS model 150 model may be generated for individual point of sales 112, and the customized POS model 150 (e.g., including the associated product distribution models 152) may be applied to current internal data 134 or external data 130 to determine when and how to distribute products 170 to respective points of sale 112.

In some embodiments, determinations of distribution of products 170 to points of sale 112 are determined by way of artificial intelligence (AI) based modeling. For example, the distribution models 146 may include individual product distribution model 152 trained to determine distribution of a product 170 to a point of sale 112 based on external data 130 (e.g., data related to weather or other events) or internal data 134 (e.g., supply and sales data or the like). As described, a POS model 150 for a given point of sale 112 may include individual product distribution models 152 for some or all of the products 170 sold by the point of sale 112, that are each trained to determine distribution of a corresponding product 170 to the point of sale 112 based on external data 130 (e.g., data related to weather or other events) or internal data 134 (e.g., supply and sales data or the like). Such trained distribution models 146 may provide an efficient and effective technique for distributing specific products to specific stores, which, in turn, may generate more sales, reduce spoilage, optimize revenue, and enhance consumer satisfaction. For example, the distribution engine 114 may receive external data 130 (e.g., indicative of one or more environmental conditions), apply the external data 130 to a product distribution model 152 concerning distribution of the given product 170 to a given point of sale 112 (e.g., a machine learning model trained to predict a quantity of the product 170 to be supplied to the given point of sale 112 based on external data 130) to determine an amount of the given product to distribute to the given point of sale 112.

In some embodiments, a product distribution model 152 is a machine learning model that is operable to determine a distribution of a product 170 to a point of sale based on external data 130. For example, the product distribution model 152 may be a machine learning model employing one or more trained machine learning algorithms that are operable to determine how and when to distribute a given product 170 to a given point of sale 112 based on external events, such as weather data and associated events. Although certain embodiments are described in the context of using weather data as an input vector to the product distribution model 152, other embodiments may employ any suitable combinations of one or more relevant subsets of external data, such as cost of delivery, location of supplier, local events, the socioeconomic status of nearby consumers, population demographics, local alerts for shoplifting activity, or the like. In some embodiments, a product distribution model 152 is trained using historical structured data or historical unstructured data. For example, a given product distribution model 152 may be trained using a distribution performance log 142 (e.g., including historical data concerning supply and sales of the given product 170 (or similar products 170) by a one or more points of sale 112) and an external data log 132 (e.g., data concerning events that influence the distribution of the product 170) to generate a product distribution model 152 that is operable to determine a quantity of the given product 170 to supply to a given point of sale 112 based on external data 130. In some embodiments, a product distribution model 152 employs a machine learning algorithm, such as Naive Bayes Classifier, Decision Trees, Random Forest, Support Vector Machines (SVM), K-Nearest Neighbors (KNN), Neural Networks, Ensemble Learning, Logistic Regression, Gradient Boosting, XGBoost, Unsupervised Clustering, FCM Clustering, Cluster Profiling, Cluster Tagging, Advanced Visualizations, or the like. For example, the product distribution model 152 may employ a Random Forest classifier model trained using an external data log 132 to determine a quality of a product 170 to supply to a given point of sale 112 based on external data 130.

In some embodiments, product models 152 employ an external data model 156 that is operable to preprocess external data 130 to generate "processed" external data 130 that is suitable for use by the external data model 156. For example, an external data model 156 may employ a language model (e.g., a large language model ("LLM")) that is trained to ingest unstructured external data 130 and generate corresponding structured external data 130 (e.g., similar to that of the structured data of external data log 132 of FIG. 3), that can be fed to one or more product distribution model 152. In such an embodiment, the LLM may process various types of structured or unstructured external data 130, including, for example, textual information from news articles (e.g., process regional news to pick up on local events or situations such as a festival or a natural disaster that might affect consumer behavior and, consequently, product demand), social media feeds (e.g., analyze social media data to identify emerging trends or shifts in consumer preferences), market trends (e.g., sift through extensive market research reports, summarizing key findings relevant to product distribution strategies), consumer reviews (e.g., evaluating customer feedback on various platforms), and the like, and generate corresponding structured external data 130. Such an external data model 156 employing a LLM may help to identify valuable insights in the external data 130 that significantly improve product distribution decision-making.

In some embodiments, a product distribution model 152 employs one or more rules to effectuate the efficient and effective distribution of products 170 to a respective point of sale 112. For example, a product distribution model 152 for a product may be designated to determine an effective minimum or maximum shelf space for a given product 170, to avoid the distribution of products 170 to a point of sale 112 in a manner that would violate the minimum or maximum shelf space for the given product 170 and thus, risk overstocking or producing waste. In such an embodiment, a minimum or maximum shelf space for a certain product 170 at a point of sale 112 may define a predetermined minimum or maximum number of the product 170 to be kept in inventory at a point of sale 112. In some embodiments, parameters such as minimum or maximum shelf space for a product 170, may be predetermined or may be automatically determined and adjusted overtime (e.g., by way of a machine learning model that determines, based on historical external or internal data, a minimum or maximum shelf space for a certain product 170 at a point of sale 112).

In some embodiments, a product distribution model 152 is designed to determine an ideal amount of a product 170 that should be distributed to a particular point of sale 112. For example, a product distribution model 152 may strategically ensure that the product 170 quantities allocated do not surpass the maximum supply available for any given product 170. In some embodiments, this maximum distribution limit is defined based on a combination of factors that determine the maximum distribution limit based on one or both of internal data 134 and external data 130. This may include, for example, product capacity (e.g., maximum number of units that can be produced within a given time frame, ensuring that distribution demands do not exceed what can be manufactured), storage limitations (e.g., capacity constraints at both the distribution centers and the point of sale, which include considerations for safe storage and preservation conditions, especially for perishable or sensitive products), historical sales data (e.g., the model may be previously trained by analyzing past sales trends for the product at specific points of sale, helping to predict future demand and avoid overstocking), market demand forecasts (e.g., predictive analysis of future market demand based on trends, seasonal variations, consumer behavior, and other relevant market research data), supply chain constraints (e.g., consideration of logistical factors, such as transportation limits, lead times from suppliers, and potential bottlenecks in the supply chain that could affect the availability of the product), financial constraints (e.g., budget limitations or cost considerations that might cap the amount of product that can be feasibly distributed without incurring financial risks), or the like.

Concerning the above-described machine learning algorithms, a given algorithm may be implemented based on its operation and characteristics. For example, Naive Bayes classification may assume independence between features, which may make it suitable for simple datasets with categorical features. Decision tree modeling may recursively split data based on feature values, which may make it effective for capturing complex decision-making processes with both categorical and numerical features. Random Forest modeling may construct multiple decision trees and combines their outputs, which may make it useful for reducing overfitting and improving accuracy by aggregating predictions. SVM modeling may find a hyperplane that maximally separates classes in a high-dimensional space, which may make it beneficial when a clear margin of separation exists. KNN modeling may classify a data point based on the majority class of its k nearest neighbors, which may benefit tasks emphasizing local similarity. Neural network modeling may create layers of interconnected nodes to learn hierarchical representations, which may be suitable for capturing complex, non-linear relationships in large datasets. Ensemble learning may combine predictions from multiple models to enhance overall performance, which may utilize techniques like bagging or boosting to boost accuracy and robustness. Logistic regression modeling may model the probability that a given instance belongs to a particular category, which may make it useful for problems requiring a probabilistic interpretation. Gradient boosting may build trees sequentially, with each tree correcting the errors of the previous ones and may be effective for combining weak learners to create a strong predictive model. XGBoost may be an ensemble learning technique suitable for handling both historical data and current availability features. Unsupervised Clustering may be a method where the AI system groups data points into clusters based on similarities without pre-labeled categories or guidance, allowing for the identification of inherent patterns or structures within the data. FCM Clustering (Fuzzy C-Means Clustering) may be an AI technique that assigns each data point to one or more clusters with varying degrees of membership, providing a more nuanced grouping compared to hard clustering methods. Cluster Profiling may be a process where the AI system characterizes and summarizes the properties or attributes of each identified cluster, providing insights into the defining features of the groupings. Cluster Tagging may be the practice of labeling or annotating the identified clusters with meaningful tags or descriptors, facilitating easier interpretation and understanding of the different groupings by end-users. Advanced Visualization may be a technique used by AI systems to present complex data and insights through visually engaging and intuitive formats, enhancing the ability to perceive and comprehend intricate patterns and relationships in the data.

In some embodiments, training of distribution models 146 includes pre-processing of a distribution model training dataset 144 used to train the models 146, including external data 130 or internal data 134 used to train the product distribution model 152, such as the distribution performance log 142 and the external data log 144. This may include, for example, removing irrelevant information (e.g., filtering out data that is not relevant to the model's objectives), standardizing data formats (e.g., converting data from various sources into a standard format), handling missing data (e.g., Addressing gaps in the data, either by filling in missing values with estimated figures or by excluding incomplete records), data normalization (e.g., scaling the data to a specific range or format), natural language processing ("NLP") techniques (e.g., parsing language, identifying key phrases or sentiment, and categorizing content based on context), and noise reduction (e.g., Removing or minimizing inconsistencies and random fluctuations in the data that can lead to inaccuracies in the distribution models' 146 output). In some embodiments, the distribution models 146 may be designed to integrate the pre-processing and processing steps into a single, unified operation.

In some embodiments, training of a distribution model 146 includes splitting the distribution model training dataset 144 into a training data subset, a validation data subset, and a testing data subset. In such an embodiment, the training dataset may be used to train the machine learning model. During this phase, the model may learn patterns and relationships within the data. For example, the algorithm may process the training data, adjusting its parameters to minimize differences between its predicted output and the actual target values. This may be an iterative process that continues until the model achieves satisfactory performance. The validation dataset may be used to fine-tune the model and optimize its hyperparameters. This may provide an independent dataset not used during training to assess how well the model generalizes to new, unseen data. During this phase, after each training iteration, the model's performance is evaluated on the validation set. Based on this evaluation, hyperparameters (e.g., learning rate, regularization, etc.) may be adjusted to improve performance without overfitting to the training data. The testing dataset may be used to assess the model's final performance and generalization to new, unseen data. It may provide an unbiased evaluation of the model's ability to make predictions on data it has never encountered before. During this phase, the model, with its optimized parameters, may be evaluated on the testing set, and its performance metrics (e.g., accuracy, precision, recall, etc.) may be calculated. This evaluation may help to estimate how well the model is expected to perform on new, real-world data. Such evaluations and fine-tune may provide relatively accurate models and associated predictions. For example, models may reach accuracies of 80% or better, which can improve over time with supplemental training data and retraining.

Figure 1B:
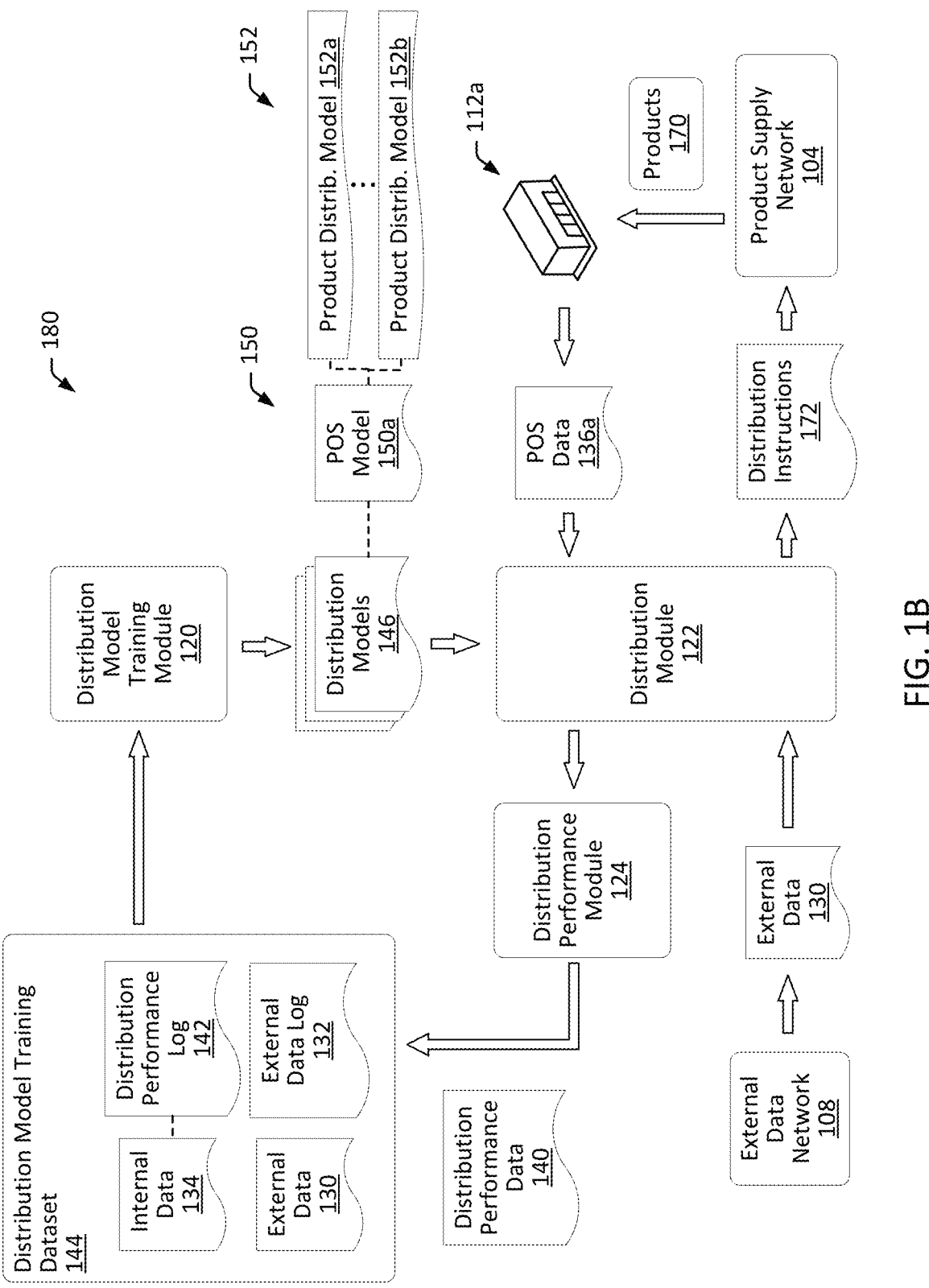
FIG. 1B is diagram that illustrates operational aspects of a distribution network environment in accordance with one or more embodiments.

FIG. 1B is a diagram that illustrates operational aspects of a product distribution environment 180 in accordance with one or more embodiments. In some embodiments, a set of distribution models 146 are generated that include one or more POS models 150, which include a first POS model 150a that is associated with the point of sale 112a, and includes one or more individual product distribution models 152 that are associated with products 170 sold by the point of sale 112a. The point of sale 112a is a grocery store ("Grocery Store A") that sells bread, milk, and cereal, a point of sale model 150a for the point of sale 112a includes a "bread" product distribution model 152a that models distribution of bread for Grocery Store A, a "milk" product distribution model 152b that models distribution of milk for Grocery Store A, and so forth for some or all of the products 170 sold by Grocery Store A. The distribution module 122 may identify, at some point in time (e.g., hourly, daily, weekly, or the like) that a product distribution is to be determined for Grocery Store A, and, in response, apply external data 130 (e.g., indicative of external events, such as forecasted weather in the geographic area of Grocery Store A, planned events in the geographic area of Grocery Store A, or the like) received from external data network 108 or POS data 136a for the point of sale 112a (e.g., that includes internal data 134 regarding performance of the point of sale 112a, such as product inventory, product dispositions, such as product sales, product disposals, or the like), to each of the one or more individual product distribution models 152 of the POS model 150a associated with Grocery Store A to determine a recommended (or "predicted") quantity of each of some or all of the corresponding products 170 to be distributed (or "supplied") to Grocery Store A. This may include, for example, feeding external data 130 and POS data 136a to the "bread" product distribution model 152a (e.g., that is operable to determine distribution of bread for Grocery Store A based on external data 130) to determine a need to distribute (or "supply") 100 loaves of bread to Grocery Store A on Wednesday, feeding external data 130 and POS data 136a to a "milk" product distribution model 152b (e.g., that is operable to determine distribution of milk for Grocery Store A based on external data 130) to determine a need to distribute (or "supply") 50 cartons of milk to Grocery Store A on Wednesday, and so forth, for some of all of the one or more individual product distribution models 152 of the POS model 150a associated with Grocery Store A. In response to the determined distributions for Grocery Store A (e.g., including 100 loaves of bread to Grocery Store A on Wednesday, and 50 cartons of milk to Grocery Store A on Wednesday), the distribution module 122 may, in turn, generate corresponding distribution instructions 172 commanding or otherwise specifying distribution of the respective quantities of the corresponding products 170 to Grocery Store A (e.g., supply 100 loaves of bread to Grocery Store A on Wednesday; supply 50 cartons of milk to Grocery Store A on Wednesday, and so forth), and transmit the distribution instructions 172 to one or more product suppliers of the product supply network 104 that are tasked with supplying the requested quantities of the products 170 to Grocery Store A. The one or more product suppliers of the product supply network 104 may, in turn, supply the requested quantities of the products 170 to Grocery Store A, where they may be stocked in inventory and sold to consumers. Such a process may be repeated for different points of sale 112 (e.g., for points of sale 112b and 112c), using respective POS models (e.g., using respective POS models 150b and 150c) and associated product distribution models (e.g., product distribution models 152a, 152c, 152d, 152e, and so forth).

The point of sale 112a (Grocery Store A) may transmit, to the distribution module 122, POS data 136a for the point of sale 112a that includes data regarding performance of Grocery Store A, such as product inventory, product dispositions (e.g., product sales, product disposals, or the like for Grocery Store A), or other information concerning operations of Grocery Store A. Other points of sale 112, such as point of sale 112b and 112c, may similarly transmit POS data 136 for the respective point of sale 112a. The POS data 136a may be received by distribution module 122 which may, in turn, forward the POS data 136a to the distribution performance module 124, along with the POS data 136 received from one more other points of sale 112 in the point of sale network 106 (e.g., POS data 136 from points of sale 112b and 112c). In some embodiments, the distribution performance module 124 may generate distribution performance data 140 corresponding to the POS data 136 received, and update internal data 134 and the distribution performance log 142 to reflect the distribution performance data 140.

Further, the distribution module 122 may forward external data 130 received from the external data network 108 (e.g., data indicative of external events, such as forecasted weather in the geographic area of Grocery Store A, planned events in the geographic area of Grocery Store A, or the like) received from external data network 108 to the distribution performance module 124. The external data network 108 may obtain external data 130 by way of, for example, monitoring feeds from sources (e.g., feeds from weather providers or news outlets, or the like), scraping sources (e.g., scraping social media site content, scraping news/weather outlet websites, or the like), or the like. In some embodiments, the distribution performance module 124 may update the external data log 132 to reflect the external data 130.

In some embodiments, the distribution models 146 are trained based on a distribution model training data set 144, which includes the distribution performance log 142 (e.g., including internal data 134) and the external data log 132. For example, the distribution model training module 120 may train the product distribution models 152 using the distribution performance log 142 (e.g., which may incorporate some or all of the POS data 136 and other internal data 134) and the external data log 132 (e.g., which may incorporate some or all of the external data 130 received). This may include generating a predictive product distribution model 152 for each of one or more products 170 sold at a point of sale 112, based on machine modeling of sales of the product 170 (or similar products) by the points of sale 112 (or similar points of sale 112) to external events. Such training may include an initial training of the product distribution model 152 (e.g., based on an initial distribution performance log 142 and an initial external data log 132), or a retraining of the product distribution models 152 (e.g., based on an updated distribution performance log 142 and an updated external data log 132). Such an embodiment may provide an efficient and effective feedback loop that provides for training and updating of the product distribution models 152, which can be applied for determining an appropriate distributions of products to points of sale 112.

Figures 5, 6, 7:
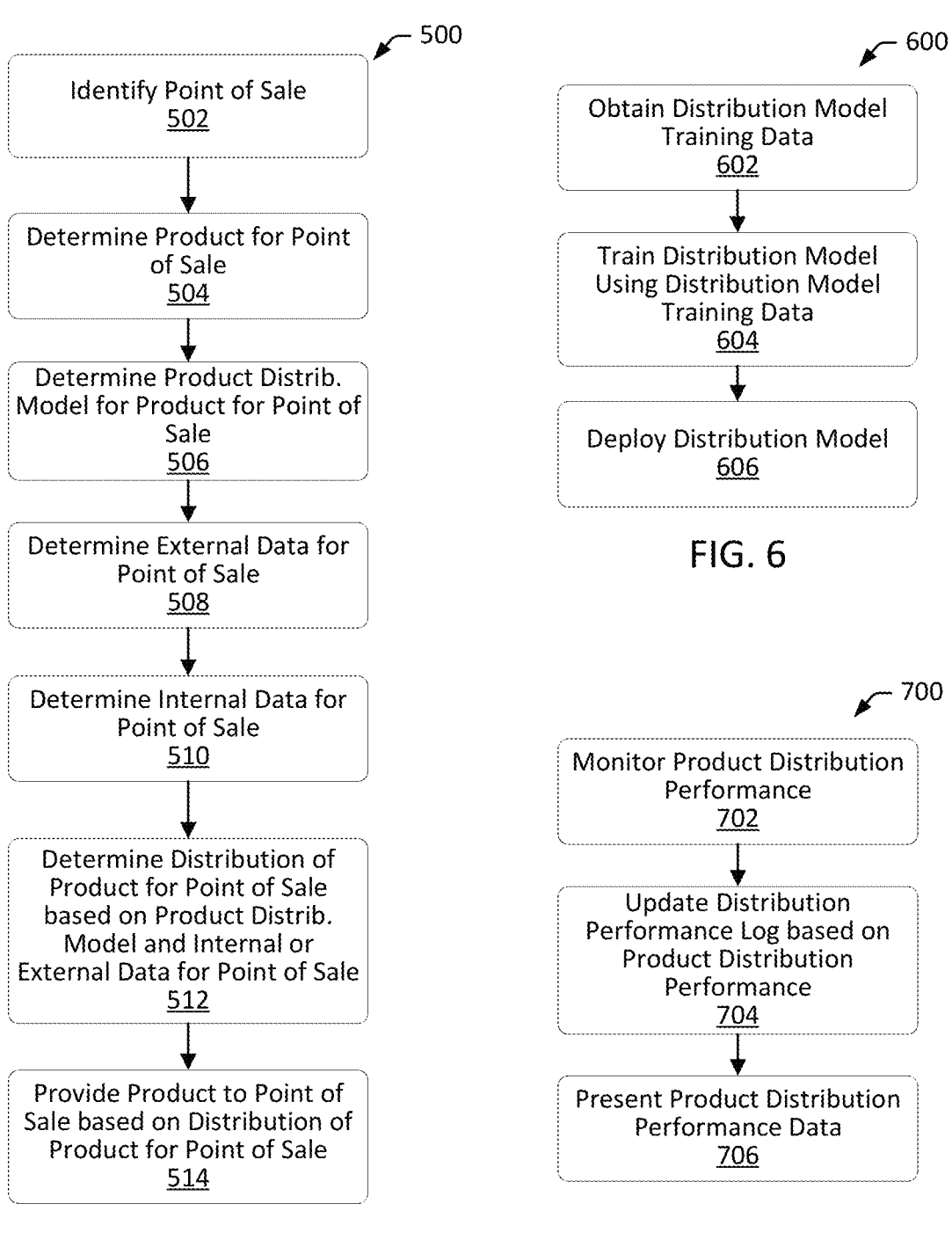
FIG. 5 is a flowchart diagram that illustrates a method of product distribution for a point of sale in accordance with one or more embodiments.
FIG. 6 is a flowchart diagram that illustrates a method of training distribution models in accordance with one or more embodiments.
FIG. 7 is a flowchart diagram that illustrates a method of monitoring product distribution performance in accordance with one or more embodiments.

FIG. 5 is a flowchart diagram that illustrates a method 500 of product distribution for a point of sale in accordance with one or more embodiments. Some or all of the procedural elements of method 500 may be performed, for example, by the distribution engine 114, the distribution module 122, or another entity.

Method 500 may include identifying a point of sale (block 502). This may include identifying a point of sale for which a product distribution is to be determined. For example, identifying a point of sale may include the distribution module 122 identifying at some point in time that a product distribution is to be determined for a given point of sale 112a (Grocery Store A). In some embodiments, the determination is done based on the occurrence of an event, such as a regularly scheduled time for assessment (e.g., hourly, daily, weekly, or the like), a request for an inventory assessment, or the like.

Method 500 may include determining a product for a point of sale (block 504). This may include identifying a product in (or to be provided in) inventory for a particular point of sale. Continuing with the above example, determining a product for a point of sale may include the distribution module 122 determining, from the array of products 170, such as bread, milk, cereal, and so forth, held in inventory by the point of sale 112a (Grocery Store A), the "bread" product 170. In other iterations of method 500 concerning point of sale 112a (Grocery Store A), this may include determining, milk, cereal, and so forth, until some or all of the products 170 held within its inventory and sold by point of sale 112a (Grocery Store A) have been assessed.

Method 500 may include determining a product distribution model for a product for a point of sale (block 506). This may include determining a product distribution model (e.g., a machine learning model) for use in determining a product distribution for a given product at a given point of sale (e.g., a "product-POS combination" or a "product-POS pair"). For example, determining a product distribution model for a product for a point of sale may include, the distribution module 122 determining, based on the identified point of sale 112a (Grocery Store A), a product distribution model 152 of POS model 150a (associated with a given point of sale 112a), and determining, based on the identified "bread" product 170, the product distribution model 152a of POS model 150a, which is designated for determining distribution of bread. In other iterations of method 500 concerning other products 170 of point of sale 112a (Grocery Store A), such as milk and cereal, this may include determining, based on the identified "milk" product 170, a "milk" product distribution model 152b designated for determining distribution of milk, and so forth.

Method 500 may include determining external data for a point of sale (block 508). This may include determining external data to be applied to a product distribution model (e.g., a machine learning model) to determine distribution of an associated product to a particular point of sale. For example, determining external data for a point of sale may include the distribution module 122 determining external data 130 (e.g., indicative of external events, such as forecasted weather in the geographic area of Grocery Store A, planned events in the geographic area of Grocery Store A, or the like) recently received from external data network 108 (e.g., within a preceding hour, day, week, month or the like). In some embodiments, determining external data for a point of sale for application to a given product distribution model may include determining a subset of external data that is relevant to the product distribution model for the product or point of sale. For example, determining external data for a point of sale for application to the "bread" product distribution model 152a for determining distribution of bread product 170 to point of sale 112a (Grocery Store A) may include the distribution module 122 determining a subset of external data 130 received from external data network 108 that is relevant to the distribution model 152b, such as identifying types of data that are relevant to demand of bread products 170 (e.g., forecast variations in weather at or near the geographic location of the point of sale 112a (Grocery Store A), collected over a limited period of time, such as the preceding hour, day, week, month or the like). Such extraction and use of relevant external data 130 may help to improve model performance by providing only the most relevant information to a product distribution model 152, and avoiding increased processing overhead that could be created by feeding the product distribution model 152 excessive amounts of irrelevant external data 130.

Method 500 may include determining internal data for a point of sale (block 510). This may include determining internal data to be applied to a product distribution model (e.g., a machine learning model) to determine distribution of an associated product to a particular point of sale. For example, determining internal data for a point of sale may include the distribution module 122 determining POS data 136a for the point of sale 112a (Grocery Store A) (e.g., that includes data regarding performance of the point of sale 112a, such as product inventory, product dispositions, such as product sales, product disposals, or the like) recently received from Grocery Store A (e.g., within a preceding hour, day, week, month or the like). In some embodiments, determining internal data for a point of sale for application to a given product distribution model may include determining a subset of internal data that is relevant to the product distribution model for the product or point of sale. For example, determining internal data for a point of sale for application to the "bread" product distribution model 152a for determining distribution of milk product 170 to point of sale 112a (Grocery Store A) may include the distribution module 122 determining a subset of internal data 130 received from points of sale 112 having similar characteristics as the point of sale 112a (Grocery Store A) that are relevant to the distribution model 152b, such as identifying types of data that are relevant to demand of bread products 170 at grocery stores (e.g., sales information for other stores within a threshold distance of the point of sale 112a (Grocery Store A) that sell bread products 170), collected over a limited period of time, such as the preceding hour, day, week, month or the like). Such extraction of relevant internal data 130 may help to improve model performance by providing only the most relevant information to a product distribution model 152, and avoiding increased processing overhead that could be created by feeding the product distribution model 152 excessive amounts of irrelevant internal data 130.

Method 500 may include determining distribution of product for a point of sale based on a product distribution model, and internal or external data for a point of sale (block 512). This may include determining a distribution of a given product to a particular point of sale, based on application of external data or internal data to the determined product distribution model for the given product and the particular point of sale. For example, determining distribution of product for a point of sale based on a product distribution model, and internal or external data for a point of sale may include the distribution module 122 feeding determined portions of external data 130 and POS data 136a (e.g., relevant to the to the "bread" product distribution model 152a (e.g., that is operable to determine distribution of bread for Grocery Store A based on external data 130) to determine a need to distribute (or "supply") 100 loaves of bread to Grocery Store A on Wednesday.

Method 500 may include providing a product to a point of sale based on the distribution of product for a point of sale (block 514). This may include providing for supply of a particular product to a point of sale based on the determined distribution of the product for the point of sale. For example, providing a product to a point of sale based on the distribution of product for a point of sale of sale may include the distribution module 122 the distribution module 122, in response to determining distribution of bread for Grocery Store A (e.g., including 100 loaves of bread to Grocery Store A on Wednesday), generating distribution instructions 172 commanding or otherwise specifying distribution of the respective quantities of the corresponding products 170 to Grocery Store A (e.g., "supply 100 loaves of bread to Grocery Store A on Wednesday . . . "), and transmitting the distribution instructions 172 to one or more product suppliers of the product supply network 104 that are tasked with supplying the requested quantities of the products 170 to Grocery Store A. As described, the one or more product suppliers of the product supply network 104 may, in turn, supply the requested quantities of the products 170 to Grocery Store A, where they may be stocked in inventory and sold to consumers.

Such a process of product distribution for a point of sale may be repeated for different points of sale 112 (e.g., 112b and 112c) and products 170, using respective POS models (e.g., POS models 150b and 150c) and associated product distribution models (e.g., product distribution models 152a, 152b, 152c, 152d, and so forth), to determine and implement distribution of various products 170 to various points of sale 112.

FIG. 6 is a flowchart diagram that illustrates a method of training distribution models in accordance with one or more embodiments. Some or all of the procedural elements of method 600 may be performed, for example, by the distribution engine 114, the distribution model training module 120, or another entity.

Method 600 may include obtaining distribution model training data (block 602). This may include obtaining model training data that is indicative of characteristics of historical distributions of products to points of sale, dispositions of products by points of sale, and external events. For example, obtaining distribution model training data may include the distribution model training module 120 obtaining a distribution model training dataset 144, which may include a distribution performance log 142 (e.g., including internal data 134), an external data log 132, or the like. In some embodiments, distribution model training data to be used for training of a given model is a subset of a distribution model training dataset 144 that is relevant to the given model. For example, in the context of a "bread" product distribution model 152a which is designated for determining distribution of bread to retail outlets that stock and sell bread, the data used for training of product distribution model 152a is a subset of a distribution model training dataset 144 (e.g., a subset of distribution performance log 142 (e.g., including internal data 134), an external data log 132, or the like) that is relevant to the demand, sales and distribution of bread. This may include, for example, a subset of the data of external data log 132 that include events relevant to stores that sell bread (e.g., data categorized as forecast variations in weather at or near the geographic location of the point of sale 112a (Grocery Store A) or the like, collected over a limited period of time, such as the preceding hour, day, week, month or the like), or a subset of data of the distribution performance log 142 (e.g., or internal data 134) relevant to stores that sell bread (e.g., sales information for stores that sell bread products 170). Such extraction of relevant internal data 130 may help to improve modeling performance by providing only the most relevant information to a product distribution modeling process, avoiding increased processing overhead that could be created by providing a training dataset having excessive amounts of irrelevant data. In some embodiments, the training dataset includes received training data (e.g., a distribution performance log 142 (e.g., including internal data 134), an external data log 132, or the like, which may be received from a third party client or other source) that is pre-processed. This may include, for example, integrating different data sets (e.g., merging internal 134 into a distribution performance log 142, merging external data 130 into an external data log 132, or the like), transformations, synthesizing, data cleaning, or the like, to generate the distribution model training dataset 144 used for modeling. Such processing may improve modeling performance by providing relevant and appropriately formatted information for modeling.

Method 600 may include training a distribution model using distribution model training data (block 604). This may include training a machine learning model based on a corresponding dataset. For example, training a distribution model using distribution model training data may include the distribution model training module 120 training the product distribution models 152 using the distribution performance log 142 (e.g., which may incorporate some or all of the POS data 136 and other internal data 134) and the external data log 132 (e.g., which may incorporate some or all of the external data 130 received). This may include generating a predictive product distribution model 152 for each of one or more products 170 sold at a point of sale 112, based on machine modeling of sales of the product 170 (or similar products) by the points of sale 112 (or similar points of sale 112) to external events. Such training may include an initial training of the product distribution model 152 (e.g., based on an initial distribution performance log 142 and an initial external data log 132), or a retraining of the product distribution models 152 (e.g., based on an updated distribution performance log 142 and an initial external data log 132). Training may, for example, generate a set of distribution models 146 that include one or more POS models 150, which include a first POS model 150*a* that is associated with a given point of sale 112*a*, and includes one or more individual product distribution models 152 that are associated with products 170 sold by the point of sale 112.

Method 600 may include deploying a distribution model (block 606). This may include employing a distribution model to predict or otherwise determine and output a product distribution based on a set of model inputs. For example, deploying a distribution model may include the distribution model training module 120 providing the a set of distribution models 146 that include one or more POS models 150, which include a first POS model 150*a* that is associated with a given point of sale 112*a*, and includes one or more individual product distribution models 152 that are associated with products 170 sold by the point of sale 112*a*, for use by the distribution module 122 in determining quantities of products 170 to be distributed to the points of sale 112.

In some embodiments, distribution models are associated with points of sale or products based on shared characteristics of the respective models, points of sale, or products. For example, a given product distribution model associated with a given type of product (e.g., bread) and given type of point of sale (e.g., grocery store in a given city) may be assigned to (or otherwise included in) a POS model 150 for one or more points of sale 112 sharing those characteristics. For example, where point of sale 112*a* (Grocery Store A) is a grocery store located in New York City that sells bread, and it is determined that the product distribution model 152*a* is trained for (or otherwise associated with) use in determining distribution of bread for grocery stores located in New York City, the distribution model training module 120 may include the product distribution model 152*a* in the POS model 150*a* for the point of sale 112*a* (Grocery Store A), for use in determining distributions of bread to the point of sale 112*a* (Grocery Store A). Such embodiments may enable assembly of customized POS models 150 for points of sale 112 based on them having the same or similar characteristics. For example, where the point of sale 112*a* (Grocery Store A) is an established grocery store in New York City that sells a given set of products (e.g., bread, milk, cereal, etc.) and having a POS model 150*a* that includes respective product distribution model 152 for the given set of products (e.g., product distribution model 152*a* for bread, product distribution model 152*b* for milk and so forth), and a "new" location of the grocery store (Grocery Store B) has just opened in New York City and has the same or similar characteristics as Grocery Store A (including the same product selection as Grocery Store A), a POS model 150 for the new Grocery Store B may include product distribution models 152 that are the same or similar to those of POS model 150*a* (e.g., including the product distribution model 152*a* for bread, the product distribution model 152*b* for milk and so forth). Thus, for example, the distribution model training module 120 may determine characteristics of a point of sale 112, determine that characteristics of the a product distribution model 152, determine that characteristics of the product distribution model 152 match characteristics of point of sale 112, and include, based on determining that the characteristics of the product distribution model 152 match characteristics of the point of sale 112, the product distribution model 152 in the POS model 150 for the point of sale 112.

As described, such embodiments may provide an efficient and effective feedback loop that provides for training and updating of product distribution models 152 (and associated point of sale models 150), which can be applied in sequence for determining an appropriate distributions of particular products 170 for particular point of sale 112.

FIG. 7 is a flowchart diagram that illustrates a method of monitoring point of sale performance in accordance with one or more embodiments. Some or all of the procedural elements of method 700 may be performed, for example, by the distribution engine 114, the distribution performance module 124, or another entity.

Method 700 may include monitoring product distribution performance (block 702). This may include obtaining data that is indicative of product inventory, product dispositions (e.g., product sales, product disposals, or the like, for one or more points of sale across a point of sale network. For example, monitoring distribution performance may include the distribution performance module 124 receiving POS data 136 from one or more points of sale 112 and generating distribution performance data 140 that corresponds to the POS data 136 received.

Method 700 may include updating distribution performance logs based on product distribution performance (block 704). This may include updating distribution performance logs to reflect obtained distribution performance data. For example, updating logs based on product distribution may include the distribution performance module 124 updating internal data 134 or the distribution performance log 142 to reflect the distribution performance data 140, including the POS data 136 from one or more points of sale 112.

Figure 8A:
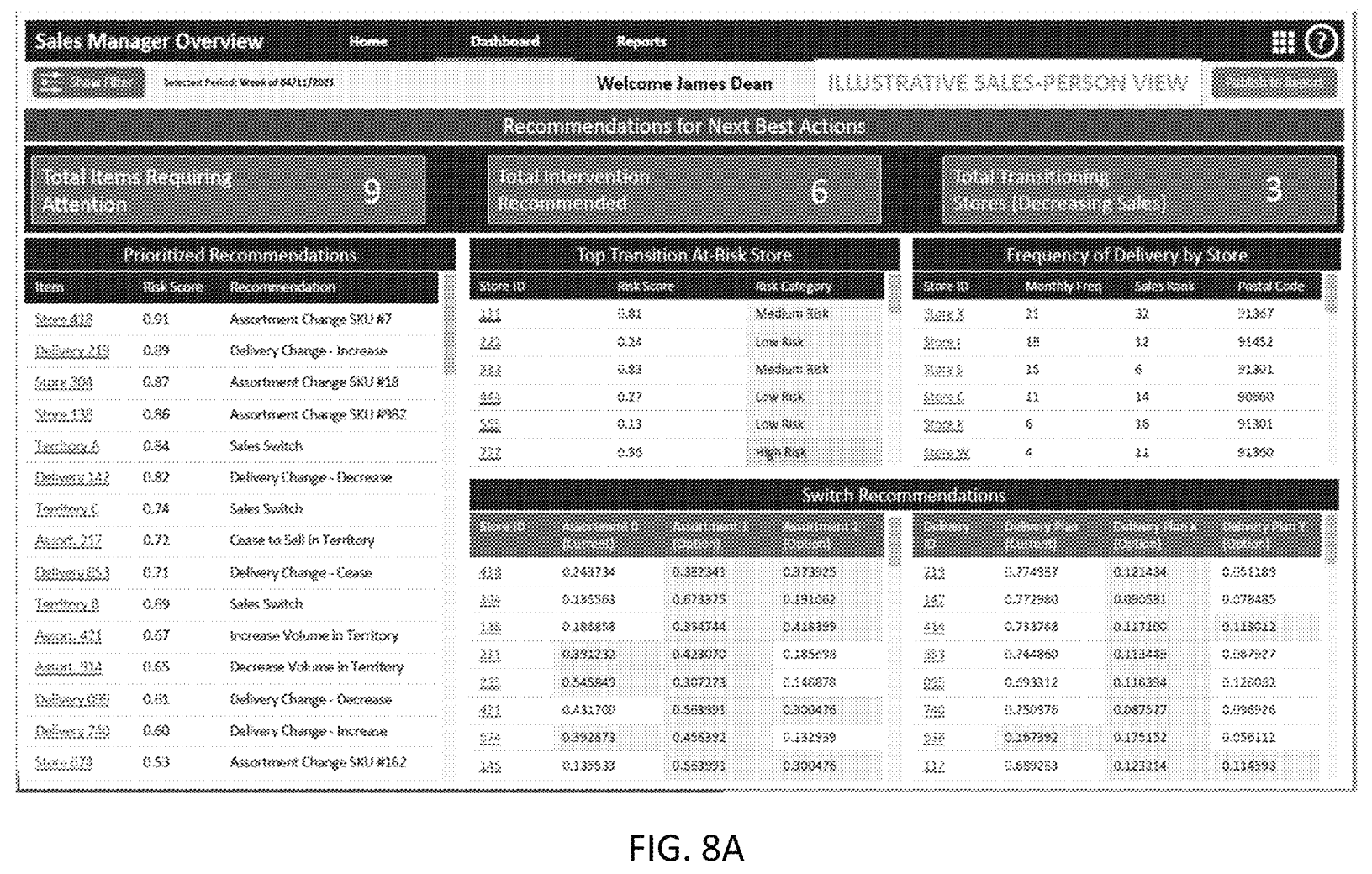
Figure 8B:

Method 700 may include presenting product distribution performance data (block 706). This may include presenting data regarding product distribution performance, such as historical data or predicted product distribution performance data. For example, presenting product distribution performance data may include the product distribution performance module 124 presenting, for output via a graphical display, graphs/charts indicative of past or predicted sales or distribution volumes (e.g., determined based on the distribution performance log 142). FIGS. 8A-8B are diagrams that illustrate example interfaces and reportings in accordance with one or more embodiments. FIG. 8A is a diagram that illustrates an example of a "Sales Manager Overview" interface that recommends next best action recommendations for the sales manager (e.g., distribution manager) with respect to product distribution. FIG. 8B is a diagram that illustrates an example of a selection within the "Sales Manager Overview" interface that further describes a particular next best action that may be recommended. Such interfaces and reportings may enable persons to quickly understand, observe, or forecast/predict trends regarding product demand and distribution. In the case of observed trends, the interfaces and reportings may enable a person to understand historical trends which may help to diagnose past issues and successes, and plan accordingly (e.g., including staffing of agents to reduce issues and increase success). In the case of forecast/predicted trends, the interfaces and reportings may enable a person to understand expected trends which may help to diagnose potential issues and successes, plan accordingly (e.g., including allocating a supply of product to a point of sale in a quantity that adequately meets consumer demand), develop KPI metrics and benchmarks, or the like.

FIG. 9 is a diagram that illustrates an example computer system (or "system") 1000 in accordance with one or more embodiments. The system 1000 may include a memory 1004, a processor 1006 and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), or bulk storage memory (e.g., CD-ROM or DVD-ROM, hard drives). The memory 1004 may include a non-transitory computer-readable storage medium having program instructions 1010 stored on the medium. The program instructions 1010 may include program modules 1012 that are executable by a computer processor (e.g., the processor 1006) to cause the functional operations described, such as those described with regard to the entities described (e.g., management system 102, distribution engine 114, distribution model training module 120, distribution module 122, distribution performance module 124, distribution manager 160, points of sale 112, product supply network 104, or external data network 108), operational aspects of a product distribution environment 180, or method 500, 600, or 700.

The processor 1006 may be any suitable processor capable of executing program instructions. The processor 1006 may include one or more processors that carry out program instructions (e.g., the program instructions of the program modules 1012) to perform the arithmetical, logical, or input/output operations described. The processor 1006 may include multiple processors that can be grouped into one or more processing cores that each include a group of one or more processors that are used for executing the processing described here, such as the independent parallel processing of partitions (or "sectors") by different processing cores to generate a simulation of a reservoir. The I/O interface 1008 may provide an interface for communication with one or more I/O devices 1014, such as a joystick, a computer mouse, a keyboard, or a display screen (e.g., an electronic display for displaying a graphical user interface (GUI)). The I/O devices 1014 may include one or more of the user input devices. The I/O devices 1014 may be connected to the I/O interface 1008 by way of a wired connection (e.g., an Industrial Ethernet connection) or a wireless connection (e.g., a Wi-Fi connection). The I/O interface 1008 may provide an interface for communication with one or more external devices 1016, computer systems, servers or electronic communication networks. In some embodiments, the I/O interface 1008 includes an antenna or a transceiver.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described here. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination thereof. Some or all of the portions of the processes and methods may be implemented by one or more of the processors/modules/applications described here.

As used throughout this application, the word "may" is used in a permissive sense (meaning having the potential to), rather than the mandatory sense (meaning must). The words "include," "including," and "includes" mean including, but not limited to. As used throughout this application, the singular forms "a," "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A product distribution system comprising:
      a distribution database storing distribution data comprising:
         a first product distribution model configured to determine a distribution of a first product to a point of sale based on external conditions data; and a second product distribution model configured to determine a distribution of a second product to a point of sale based on external conditions data; and non-transitory computer readable storage medium comprising program instructions stored thereon that are executable by a processor to perform the following operations for product distribution:

receiving, by a distribution engine, external conditions data indicative of one or more environmental conditions concerning distribution of products from a first point of sale;

determining, by the distribution engine, the first POS product distribution model for the first point of sale, the first POS product distribution model comprising:

a first product distribution model configured to determine a distribution of the first product to the first point of sale based on external conditions data; and a second product distribution model configured to determine a distribution of the second product to the first point of sale based on external conditions data;

determining, by the distribution engine based on application of the external conditions data to the first POS product distribution model, a product distribution to the first point of sale, comprising:

determining, by the distribution engine based on application of the external conditions data to the first product distribution model, a distribution of the first product to the first point of sale, determining, by the distribution engine based on application of the external conditions data to the second product distribution model, a distribution of the second product to the first point of sale, the product distribution to the first point of sale comprising the distribution of the first product to the first point of sale and the distribution of the second product to the second point of sale; and providing, by the distribution engine to a product supply network, supply instructions for the first point of sale, the supply instructions for the first point of sale comprising: first product supply instructions configured to cause the product supply network to provide the distribution of the first product to the first point of sale; and second product supply instructions configured to cause the product supply network to provide the distribution of the second product to the first point of sale.

2. The system of embodiment 1, wherein the product supply network distributes the first product to the first point of sale and distributes the second product to the second point of sale.

3. The system of embodiment 1 or 2, the operations further comprising:

determining characteristics of the first point of sale;

determining characteristics of the first product distribution model;

determining that the characteristics of the first product distribution model match characteristics of the first point of sale;

including, based on determining that the characteristics of the first product distribution model match characteristics of the first point of sale, the first product distribution model in the first POS product distribution model;

determining characteristics of the second product distribution model;

determining that the characteristics of the second product distribution model match characteristics of the first point of sale;

including, based on determining that the characteristics of the second product distribution model match characteristics of the first point of sale, the second product distribution model in the first POS product distribution model.

4. The system of any one of embodiments 1-3, the operations further comprising:

determining, by the distribution engine, distribution performance data indicative of distribution of products to one or more points of sale and disposition of the first and second products by the one or more points of sale;

training, by the distribution engine based on the distribution performance data, the first product distribution model; and training, by the distribution engine based on the distribution performance data, the second product distribution model.

5. The system of embodiment 4, the operations further comprising:

obtaining, by the distribution engine, historical external conditions data; and determining, by the distribution engine, first historical external conditions data comprising a first subset of the historical external conditions data that is indicative of one or more environmental conditions concerning distribution of the first product from one or more points of sale; and determining, by the distribution engine, second historical external conditions data comprising a second subset of the historical external conditions data that is indicative of one or more environmental conditions concerning distribution of the second product from one or more points of sale, wherein the first product distribution model is trained based on the first historical external conditions data, and wherein the second product distribution model is trained based on the second historical external conditions data.

6. The system of any one of embodiments 1-5, the operations further comprising:

receiving, by the distribution engine, second external conditions data indicative of one or more environmental conditions concerning distribution of products from a second point of sale;

determining, by the distribution engine, a second POS product distribution model for the second point of sale, the second POS product distribution model comprising:

a third product distribution model configured to determine a distribution of the first product to the second point of sale based on external conditions data; and a fourth product distribution model configured to determine a distribution of the second product to the second point of sale based on external conditions data;

determining, by the distribution engine based on application of the second external conditions data to the second POS product distribution model, a product distribution to the second point of sale, comprising:

determining, by the distribution engine based on application of the second external conditions data to the third product distribution model, a distribution of the first product to the second point of sale, determining, by the distribution engine based on application of the second external conditions data to the fourth product distribution model, a distribution of the second product to the second point of sale, the product distribution to the second point of sale comprising the distribution of the first product to the second point of sale and the distribution of the second product to the second point of sale; and providing, by the distribution engine to the product supply network, supply instructions for the second point of sale, the supply instructions for the second point of sale comprising:

third product supply instructions configured to cause the product supply network to provide the distribution of the first product to the second point of sale; and fourth product supply instructions configured to cause the product supply network to provide the distribution of the second product to the second point of sale.

7. A method of product distribution, the method comprising:

receiving, by a distribution engine, external conditions data indicative of one or more environmental conditions concerning distribution of products from a first point of sale;

determining, by the distribution engine, a first point of sale (POS) product distribution model for the first point of sale, the first POS product distribution model comprising:

a first product distribution model configured to determine a distribution of the first product to the first point of sale based on external conditions data; and a second product distribution model configured to determine a distribution of the second product to the first point of sale based on external conditions data;

determining, by the distribution engine based on application of external conditions data to the first POS product distribution model, a product distribution to the first point of sale, comprising:

determining, by the distribution engine based on application of the external conditions data to the first product distribution model, a distribution of the first product to the first point of sale, determining, by the distribution engine based on application of the external conditions data to the second product distribution model, a distribution of the second product to the first point of sale, the product distribution to the first point of sale comprising the distribution of the first product to the first point of sale and the distribution of the second product to the first point of sale; and providing, by the distribution engine to a product supply network, supply instructions for the first point of sale, the supply instructions for the first point of sale comprising: first product supply instructions configured to cause the product supply network to provide the distribution of the first product to the first point of sale; and second product supply instructions configured to cause the product supply network to provide the distribution of the second product to the first point of sale.

8. The method of embodiment 7, further comprising:

providing, by the product supply network, the distribution of the first product to the first point of sale; and providing, by the product supply network, the distribution of the second product to the second point of sale.

9. The method of embodiment 7 or 8, further comprising:

determining characteristics of the first point of sale;

determining characteristics of the first product distribution model;

determining that the characteristics of the first product distribution model match characteristics of the first point of sale;

including, based on determining that the characteristics of the first product distribution model match characteristics of the first point of sale, the first product distribution model in the first POS product distribution model;

determining characteristics of the second product distribution model;

determining that the characteristics of the second product distribution model match characteristics of the first point of sale;

including, based on determining that the characteristics of the second product distribution model match characteristics of the first point of sale, the second product distribution model in the first POS product distribution model.

10. The method of any one of embodiments 7-9, further comprising:

determining, by the distribution engine, distribution performance data indicative of distribution of products to one or more points of sale and disposition of the first and second products by the one or more points of sale;

training, by the distribution engine based on the distribution performance data, the first product distribution model; and training, by the distribution engine based on the distribution performance data, the second product distribution model.

11. The method of embodiment 10, further comprising:

obtaining, by the distribution engine, historical external conditions data; and determining, by the distribution engine, first historical external conditions data comprising a first subset of the historical external conditions data that is indicative of one or more environmental conditions concerning distribution of the first product from one or more points of sale; and determining, by the distribution engine, second historical external conditions data comprising a second subset of the historical external conditions data that is indicative of one or more environmental conditions concerning distribution of the second product from one or more points of sale, wherein the first product distribution model is trained based on the first historical external conditions data, and wherein the second product distribution model is trained based on the second historical external conditions data.

12. The method of any one of embodiments 7-11, further comprising:

receiving, by the distribution engine, second external conditions data indicative of one or more environmental conditions concerning distribution of products from a second point of sale;

determining, by the distribution engine, a second POS product distribution model for the second point of sale, the second POS product distribution model comprising:

a third product distribution model configured to determine a distribution of the first product to the second point of sale based on external conditions data; and a fourth product distribution model configured to determine a distribution of the second product to the second point of sale based on external conditions data;

determining, by the distribution engine based on application of the second external conditions data to the second POS product distribution model, a product distribution to the second point of sale, comprising:

determining, by the distribution engine based on application of the second external conditions data to the third product distribution model, a distribution of the first product to the second point of sale, determining, by the distribution engine based on application of the second external conditions data to the fourth product distribution model, a distribution of the second product to the second point of sale, the product distribution to the second point of sale comprising the distribution of the first product to the second point of sale and the distribution of the second product to the second point of sale; and providing, by the distribution engine to the product supply network, supply instructions for the second point of sale, the supply instructions for the second point of sale comprising:

third product supply instructions configured to cause the product supply network to provide the distribution of the first product to the second point of sale; and fourth product supply instructions configured to cause the product supply network to provide the distribution of the second product to the second point of sale.

13. A non-transitory computer readable storage medium comprising program instructions stored thereon that are executable by a processor to cause performance of the operations of any one of embodiments 1-12.

What is claimed is:

1. A product distribution system comprising:

a distribution database storing distribution data comprising:

a first product distribution model configured to determine a distribution of a first product to a point of sale based on external conditions data; and a second product distribution model configured to determine a distribution of a second product to a point of sale based on external conditions data; and non-transitory computer readable storage medium comprising program instructions stored thereon that are executable by a processor to perform the following operations for product distribution:

determining, by a distribution engine, historical external conditions data indicative of environmental conditions impacting product distribution;

determining, by the distribution engine, first historical external conditions data comprising a first subset of the historical external conditions data that is indicative of one or more environmental conditions affecting distribution of the first product to one or more points of sale;

determining, by the distribution engine, second historical external conditions data comprising a second subset of the historical external conditions data that is indicative of one or more environmental conditions affecting distribution of the second product to one or more points of sale;

determining, by the distribution engine, distribution performance data indicative of distribution of products to one or more points of sale and disposition of the first and second products by the one or more points of sale;

training, by the distribution engine based on the first historical external conditions data and the distribution performance data, the first product distribution model, the first product distribution model associated with a first set of external condition data types identified as relevant to distribution of the first product during training;

training, by the distribution engine based on the second historical external conditions data and the distribution performance data, the second product distribution model, the second product distribution model associated with a second set of external condition data types identified as relevant to distribution of the second product during training;

receiving, by the distribution engine, external conditions data indicative of one or more environmental conditions affecting distribution of products to a first point of sale;

determining, by the distribution engine, a first point of sale (POS) product distribution model for the first point of sale, the first POS product distribution model comprising:

the first product distribution model configured to determine a distribution of the first product to the first point of sale based on external conditions data; and the second product distribution model configured to determine a distribution of the second product to the first point of sale based on external conditions data, the determining of the first POS product distribution model comprising:

determining characteristics of the first point of sale;

determining characteristics of the first product distribution model;

determining that the characteristics of the first product distribution model match characteristics of the first point of sale;

including, based on determining that the characteristics of the first product distribution model match characteristics of the first point of sale, the first product distribution model in the first POS product distribution model;

determining characteristics of the second product distribution model;

determining that the characteristics of the second product distribution model match characteristics of the first point of sale; and including, based on determining that the characteristics of the second product distribution model match characteristics of the first point of sale, the second product distribution model in the first POS product distribution model;

extracting, by the distribution engine based on the first and second sets of external condition data types, POS-product external conditions comprising:

a first subset of the external conditions data that corresponds to the first point of sale and the first product; and a second subset of the external conditions data that corresponds to the first point of sale and the second product;

determining, by the distribution engine based on application of the POS-product external conditions data to the first POS product distribution model, a product distribution to the first point of sale, comprising:

determining, by the distribution engine based on application of the first subset of the external conditions data to the first product distribution model, a distribution of the first product to the first point of sale; and determining, by the distribution engine based on application of the second subset of the external conditions data to the second product distribution model, a distribution of the second product to the first point of sale, the product distribution to the first point of sale comprising the distribution of the first product to the first point of sale and the distribution of the second product to the first point of sale; and providing, by the distribution engine to a product supply network, supply instructions for the first point of sale, the supply instructions for the first point of sale comprising:

first product supply instructions configured to cause the product supply network to provide the distribution of the first product to the first point of sale; and second product supply instructions configured to cause the product supply network to provide the distribution of the second product to the first point of sale, the product supply network configured to:

distribute, responsive to the first product supply instructions, the first product to the first point of sale; and distribute, responsive to the second product supply instructions, the second product to the first point of sale;

obtaining, by the distribution engine, updated distribution performance data indicative of disposition of the first and second products by the first point of sale, the updated distribution performance data comprising:

first updated distribution performance data indicative of distribution and disposition of the first product by the first point of sale following the first product supply instructions; and second updated distribution performance data indicative of distribution and disposition of the second product by the first point of sale following the second product supply instructions;

retraining, by the distribution engine based on the updated distribution performance data, the first product distribution model to generate an updated first product distribution model configured to determine a distribution of the first product to a point of sale based on external conditions data;

retraining, by the distribution engine based on the updated distribution performance data, the second product distribution model to generate an updated second product distribution model configured to determine a distribution of the second product to a point of sale based on external conditions data; and determining, by the distribution engine, updated product supply instructions for distributing the first product and second product to the first point of sale, the product supply network configured to distribute, responsive to the updated product supply instructions, the first product and the second product to the first point of sale.

2. The system of claim 1, the operations further comprising:

receiving, by the distribution engine, second external conditions data indicative of one or more environmental conditions affecting distribution of products to a second point of sale;

determining, by the distribution engine, a second POS product distribution model for the second point of sale, the second POS product distribution model comprising:

a third product distribution model configured to determine a distribution of the first product to the second point of sale based on external conditions data; and a fourth product distribution model configured to determine a distribution of the second product to the second point of sale based on external conditions data;

determining, by the distribution engine based on application of the second external conditions data to the second POS product distribution model, a product distribution to the second point of sale, comprising:

determining, by the distribution engine based on application of the second external conditions data to the third product distribution model, a distribution of the first product to the second point of sale, determining, by the distribution engine based on application of the second external conditions data to the fourth product distribution model, a distribution of the second product to the second point of sale, the product distribution to the second point of sale comprising the distribution of the first product to the second point of sale and the distribution of the second product to the second point of sale; and providing, by the distribution engine to the product supply network, supply instructions for the second point of sale, the supply instructions for the second point of sale comprising:

third product supply instructions configured to cause the product supply network to provide the distribution of the first product to the second point of sale; and fourth product supply instructions configured to cause the product supply network to provide the distribution of the second product to the second point of sale.

3. The system of claim 1, the operations further comprising:

determining, by the distribution engine, updated historical external conditions data comprising:

first updated conditions affecting the distribution of the first product to the first point of sale responsive to the first product supply instructions; and second updated conditions affecting the distribution of the second product to the first point of sale responsive to the second product supply instructions, the retraining of the first product distribution model to generate the updated first product distribution model being further based on the updated historical external conditions data, and the retraining of the second product distribution model to generate the updated second product distribution model being further based on the updated historical external conditions data.

4. The system of claim 3, the operations further comprising dynamically adjusting distribution instructions based on external condition updates comprising:

receiving, by the distribution engine, updated external conditions data indicative of one or more environmental conditions affecting distribution of products to the first point of sale;

determining, by the distribution engine, an updated POS product distribution model for the first point of sale, the updated POS product distribution model comprising:

the updated first product distribution model; and the updated second product distribution model;

determining, by the distribution engine based on application of the updated external conditions data to the updated POS product distribution model, an updated product distribution to the first point of sale, comprising:

determining, by the distribution engine based on application of the updated external conditions data to the updated first product distribution model, an updated distribution of the first product to the first point of sale, determining, by the distribution engine based on application of the updated external conditions data to the updated second product distribution model, an updated distribution of the second product to the first point of sale, the updated product distribution to the first point of sale comprising the updated distribution of the first product to the first point of sale and the updated distribution of the second product to the first point of sale; and providing, by the distribution engine to the product supply network, updated supply instructions for the first point of sale, the updated supply instructions for the first point of sale comprising:

third product supply instructions configured to cause the product supply network to provide the updated distribution of the first product to the first point of sale; and fourth product supply instructions configured to cause the product supply network to provide the updated distribution of the second product to the first point of sale.

5. A method of product distribution, the method comprising:

determining, by a distribution engine, historical external conditions data indicative of environmental conditions impacting product distribution;

determining, by the distribution engine, first historical external conditions data comprising a first subset of the historical external conditions data that is indicative of one or more environmental conditions affecting distribution of the first product to one or more points of sale;

determining, by the distribution engine, second historical external conditions data comprising a second subset of the historical external conditions data that is indicative of one or more environmental conditions affecting distribution of the second product to one or more points of sale;

determining, by the distribution engine, distribution performance data indicative of distribution of products to one or more points of sale and disposition of the first and second products by the one or more points of sale;

training, by the distribution engine based on the first historical external conditions data and the distribution performance data, a first product distribution model, the first product distribution model associated with a first set of external condition data types identified as relevant to distribution of the first product during training;

training, by the distribution engine based on the second historical external conditions data and the distribution performance data, a second product distribution model, the second product distribution model associated with a second set of external condition data types identified as relevant to distribution of the second product during training;

receiving, by the distribution engine, external conditions data indicative of one or more environmental conditions affecting distribution of products to a first point of sale;

determining, by the distribution engine, a first point of sale (POS) product distribution model for the first point of sale, the first POS product distribution model comprising:

the first product distribution model configured to determine a distribution of the first product to the first point of sale based on external conditions data; and the second product distribution model configured to determine a distribution of the second product to the first point of sale based on external conditions data, the determining of the first POS product distribution model comprising:

determining characteristics of the first point of sale;

determining characteristics of the first product distribution model;

determining that the characteristics of the first product distribution model match characteristics of the first point of sale;

including, based on determining that the characteristics of the first product distribution model match characteristics of the first point of sale, the first product distribution model in the first POS product distribution model;

determining characteristics of the second product distribution model;

determining that the characteristics of the second product distribution model match characteristics of the first point of sale; and including, based on determining that the characteristics of the second product distribution model match characteristics of the first point of sale, the second product distribution model in the first POS product distribution model;

extracting, by the distribution engine based on the first and second sets of external condition data types, POS-product external conditions comprising:

a first subset of the external conditions data that corresponds to the first point of sale and the first product; and a second subset of the external conditions data that corresponds to the first point of sale and the second product;

determining, by the distribution engine based on application of the POS-product external conditions data to the first POS product distribution model, a product distribution to the first point of sale, comprising:

determining, by the distribution engine based on application of the first subset of the external conditions data to the first product distribution model, a distribution of the first product to the first point of sale; and determining, by the distribution engine based on application of the second subset of the external conditions data to the second product distribution model, a distribution of the second product to the first point of sale, the product distribution to the first point of sale comprising the distribution of the first product to the first point of sale and the distribution of the second product to the first point of sale; and providing, by the distribution engine to a product supply network, supply instructions for the first point of sale, the supply instructions for the first point of sale comprising:

first product supply instructions configured to cause the product supply network to provide the distribution of the first product to the first point of sale; and second product supply instructions configured to cause the product supply network to provide the distribution of the second product to the first point of sale, the product supply network configured to:

distribute, responsive to the first product supply instructions, the first product to the first point of sale; and distribute, responsive to the second product supply instructions, the second product to the first point of sale;

obtaining, by the distribution engine, updated distribution performance data indicative of disposition of the first and second products by the first point of sale, the updated distribution performance data comprising:

first updated distribution performance data indicative of distribution and disposition of the first product by the first point of sale following the first product supply instructions; and second updated distribution performance data indicative of distribution and disposition of the second product by the first point of sale following the second product supply instructions;

retraining, by the distribution engine based on the updated distribution performance data, the first product distribution model to generate an updated first product distribution model configured to determine a distribution of the first product to a point of sale based on external conditions data;

retraining, by the distribution engine based on the updated distribution performance data, the second product distribution model to generate an updated second product distribution model configured to determine a distribution of the second product to a point of sale based on external conditions data; and determining, by the distribution engine, updated product supply instructions for distributing the first product and second product to the first point of sale, the product supply network configured to distribute, responsive to the updated product supply instructions, the first product and the second product to the first point of sale.

6. The method of claim 5, further comprising:

distributing, by the product supply network responsive to the first product supply instructions, the first product to the first point of sale;

distributing, by the product supply network responsive to the second product supply instructions, the second product to the first point of sale; and distributing, by the product supply network responsive to the updated product supply instructions, the first product and the second product to the first point of sale.

7. The method of claim 5, further comprising:

receiving, by the distribution engine, second external conditions data indicative of one or more environmental conditions affecting distribution of products to a second point of sale;

determining, by the distribution engine, a second POS product distribution model for the second point of sale, the second POS product distribution model comprising:

a third product distribution model configured to determine a distribution of the first product to the second point of sale based on external conditions data; and a fourth product distribution model configured to determine a distribution of the second product to the second point of sale based on external conditions data;

determining, by the distribution engine based on application of the second external conditions data to the second POS product distribution model, a product distribution to the second point of sale, comprising:

determining, by the distribution engine based on application of the second external conditions data to the third product distribution model, a distribution of the first product to the second point of sale, determining, by the distribution engine based on application of the second external conditions data to the fourth product distribution model, a distribution of the second product to the second point of sale, the product distribution to the second point of sale comprising the distribution of the first product to the second point of sale and the distribution of the second product to the second point of sale; and providing, by the distribution engine to the product supply network, supply instructions for the second point of sale, the supply instructions for the second point of sale comprising:

third product supply instructions configured to cause the product supply network to provide the distribution of the first product to the second point of sale; and fourth product supply instructions configured to cause the product supply network to provide the distribution of the second product to the second point of sale.

8. The method of claim 5, further comprising:

determining, by the distribution engine, updated historical external conditions data comprising:

first updated conditions affecting the distribution of the first product to the first point of sale responsive to the first product supply instructions; and second updated conditions affecting the distribution of the second product to the first point of sale responsive to the second product supply instructions, the retraining of the first product distribution model to generate the updated first product distribution model being further based on the updated historical external conditions data, and the retraining of the second product distribution model to generate the updated second product distribution model being further based on the updated historical external conditions data.

9. The method of claim 8, further comprising dynamically adjusting distribution instructions based on external condition updates comprising:

receiving, by the distribution engine, updated external conditions data indicative of one or more environmental conditions affecting distribution of products to the first point of sale;

determining, by the distribution engine, an updated POS product distribution model for the first point of sale, the updated POS product distribution model comprising:
the updated first product distribution model; and
the updated second product distribution model;

determining, by the distribution engine based on application of the second external conditions data to the updated POS product distribution model, an updated product distribution to the first point of sale, comprising:
determining, by the distribution engine based on application of the updated external conditions data to the updated first product distribution model, an updated distribution of the first product to the first point of sale,
determining, by the distribution engine based on application of the updated external conditions data to the updated second product distribution model, an updated distribution of the second product to the first point of sale,
the updated product distribution to the first point of sale comprising the updated distribution of the first product to the first point of sale and the updated distribution of the second product to the first point of sale; and providing, by the distribution engine to the product supply network, updated supply instructions for the first point of sale, the updated supply instructions for the first point of sale comprising:
third product supply instructions configured to cause the product supply network to provide the updated distribution of the first product to the first point of sale; and
fourth product supply instructions configured to cause the product supply network to provide the updated distribution of the second product to the first point of sale.

10. A non-transitory computer readable storage medium comprising program instructions stored thereon that are executable by a processor to perform the following operations for product distribution:
determining, by a distribution engine, historical external conditions data indicative of environmental conditions impacting product distribution;
determining, by the distribution engine, first historical external conditions data comprising a first subset of the historical external conditions data that is indicative of one or more environmental conditions affecting distribution of the first product to one or more points of sale;
determining, by the distribution engine, second historical external conditions data comprising a second subset of the historical external conditions data that is indicative of one or more environmental conditions affecting distribution of the second product to one or more points of sale;
determining, by the distribution engine, distribution performance data indicative of distribution of products to one or more points of sale and disposition of the first and second products by the one or more points of sale;
training, by the distribution engine based on the first historical external conditions data and the distribution performance data, a first product distribution model, the first product distribution model associated with a first set of external condition data types identified as relevant to distribution of the first product during training;
training, by the distribution engine based on the second historical external conditions data and the distribution performance data, a second product distribution model, the second product distribution model associated with a second set of external condition data types identified as relevant to distribution of the second product during training;

receiving, by the distribution engine, external conditions data indicative of one or more environmental conditions affecting distribution of products to a first point of sale;

determining, by the distribution engine, a first point of sale (POS) product distribution model for the first point of sale, the first POS product distribution model comprising:
the first product distribution model configured to determine a distribution of the first product to the first point of sale based on external conditions data; and
the second product distribution model configured to determine a distribution of the second product to the first point of sale based on external conditions data,
the determining of the first POS product distribution model comprising:
determining characteristics of the first point of sale;
determining characteristics of the first product distribution model;
determining that the characteristics of the first product distribution model match characteristics of the first point of sale;
including, based on determining that the characteristics of the first product distribution model match characteristics of the first point of sale, the first product distribution model in the first POS product distribution model;
determining characteristics of the second product distribution model;
determining that the characteristics of the second product distribution model match characteristics of the first point of sale; and
including, based on determining that the characteristics of the second product distribution model match characteristics of the first point of sale, the second product distribution model in the first POS product distribution model;

extracting, by the distribution engine based on the first and second sets of external condition data types, POS-product external conditions comprising:
a first subset of the external conditions data that corresponds to the first point of sale and the first product; and
a second subset of the external conditions data that corresponds to the first point of sale and the second product;

determining, by the distribution engine based on application of the POS-product external conditions data to the first POS product distribution model, a product distribution to the first point of sale, comprising:
determining, by the distribution engine based on application of the first subset of the external conditions data to the first product distribution model, a distribution of the first product to the first point of sale,
determining, by the distribution engine based on application of the second subset of the external conditions data to the second product distribution model, a distribution of the second product to the first point of sale, the product distribution to the first point of sale comprising the distribution of the first product to the first point of sale and the distribution of the second product to the first point of sale; and providing, by the distribution engine to a product supply network, supply instructions for the first point of sale, the supply instructions for the first point of sale comprising:

first product supply instructions configured to cause the product supply network to provide the distribution of the first product to the first point of sale; and second product supply instructions configured to cause the product supply network to provide the distribution of the second product to the first point of sale, the product supply network configured to:

distribute, responsive to the first product supply instructions, the first product to the first point of sale; and distribute, responsive to the second product supply instructions, the second product to the first point of sale;

obtaining, by the distribution engine, updated distribution performance data indicative of disposition of the first and second products by the first point of sale, the updated distribution performance data comprising:

first updated distribution performance data indicative of distribution and disposition of the first product by the first point of sale following the first product supply instructions; and second updated distribution performance data indicative of distribution and disposition of the second product by the first point of sale following the second product supply instructions;

retraining, by the distribution engine based on the updated distribution performance data, the first product distribution model to generate an updated first product distribution model configured to determine a distribution of the first product to a point of sale based on external conditions data;

retraining, by the distribution engine based on the updated distribution performance data, the second product distribution model to generate an updated second product distribution model configured to determine a distribution of the second product to a point of sale based on external conditions data; and determining, by the distribution engine, updated product supply instructions for distributing the first product and second product to the first point of sale, the product supply network configured to distribute, responsive to the updated product supply instructions, the first product and the second product to the first point of sale.

11. The medium of claim 10, the operations further comprising:

distributing, by the product supply network responsive to the first product supply instructions, the first product to the first point of sale;

distributing, by the product supply network responsive to the second product supply instructions, the second product to the first point of sale; and distributing, by the product supply network responsive to the updated product supply instructions, the first product and the second product to the first point of sale.

12. The medium of claim 10, the operations further comprising:

receiving, by the distribution engine, second external conditions data indicative of one or more environmental conditions affecting distribution of products to a second point of sale;

determining, by the distribution engine, a second POS product distribution model for the second point of sale, the second POS product distribution model comprising:

a third product distribution model configured to determine a distribution of the first product to the second point of sale based on external conditions data; and a fourth product distribution model configured to determine a distribution of the second product to the second point of sale based on external conditions data;

determining, by the distribution engine based on application of the second external conditions data to the second POS product distribution model, a product distribution to the second point of sale, comprising:

determining, by the distribution engine based on application of the second external conditions data to the third product distribution model, a distribution of the first product to the second point of sale, determining, by the distribution engine based on application of the second external conditions data to the fourth product distribution model, a distribution of the second product to the second point of sale, the product distribution to the second point of sale comprising the distribution of the first product to the second point of sale and the distribution of the second product to the second point of sale; and providing, by the distribution engine to the product supply network, supply instructions for the second point of sale, the supply instructions for the second point of sale comprising:

third product supply instructions configured to cause the product supply network to provide the distribution of the first product to the second point of sale; and fourth product supply instructions configured to cause the product supply network to provide the distribution of the second product to the second point of sale.

13. The medium of claim 10, the operations further comprising:

determining, by the distribution engine, updated historical external conditions data comprising:

first updated conditions affecting the distribution of the first product to the first point of sale responsive to the first product supply instructions; and second updated conditions affecting the distribution of the second product to the first point of sale responsive to the second product supply instructions, the retraining of the first product distribution model to generate the updated first product distribution model being further based on the updated historical external conditions data, and the retraining of the second product distribution model to generate the updated second product distribution model being further based on the updated historical external conditions data.

14. The medium of claim 13, the operations further comprising dynamically adjusting distribution instructions based on external condition updates comprising:

receiving, by the distribution engine, updated external conditions data indicative of one or more environmental conditions affecting distribution of products to the first point of sale;

determining, by the distribution engine, an updated POS product distribution model for the first point of sale, the updated POS product distribution model comprising:
the updated first product distribution model; and
the updated second product distribution model;

determining, by the distribution engine based on application of the updated external conditions data to the updated POS product distribution model, an updated product distribution to the first point of sale, comprising:
determining, by the distribution engine based on application of the updated external conditions data to the updated first product distribution model, an updated distribution of the first product to the first point of sale,
determining, by the distribution engine based on application of the updated external conditions data to the updated second product distribution model, an updated distribution of the second product to the first point of sale,
the updated product distribution to the first point of sale comprising the updated distribution of the first product to the first point of sale and the updated distribution of the second product to the first point of sale; and providing, by the distribution engine to the product supply network, updated supply instructions for the first point of sale, the updated supply instructions for the first point of sale comprising:
third product supply instructions configured to cause the product supply network to provide the updated distribution of the first product to the first point of sale; and
fourth product supply instructions configured to cause the product supply network to provide the updated distribution of the second product to the first point of sale.

* * * * *